United States Patent
Bagnato

(10) Patent No.: US 11,058,071 B2
(45) Date of Patent: Jul. 13, 2021

(54) METHOD OF PRODUCING MUSHROOMS

(71) Applicant: Maurizio Bagnato, Rome (IT)

(72) Inventor: Maurizio Bagnato, Rome (IT)

( * ) Notice: Subject to any disclaimer, the term of this patent is extended or adjusted under 35 U.S.C. 154(b) by 690 days.

(21) Appl. No.: 15/765,107

(22) PCT Filed: Sep. 30, 2016

(86) PCT No.: PCT/IB2016/055876
§ 371 (c)(1),
(2) Date: Mar. 30, 2018

(87) PCT Pub. No.: WO2017/056059
PCT Pub. Date: Apr. 6, 2017

(65) Prior Publication Data
US 2019/0045724 A1 Feb. 14, 2019

(30) Foreign Application Priority Data
Oct. 1, 2015 (IT) .................. IT102015000057159

(51) Int. Cl.
A01G 18/20 (2018.01)
A01G 18/64 (2018.01)
A01G 18/00 (2018.01)
A01G 18/80 (2018.01)

(52) U.S. Cl.
CPC ............ *A01G 18/64* (2018.02); *A01G 18/00* (2018.02); *A01G 18/20* (2018.02); *A01G 18/80* (2018.02)

(58) Field of Classification Search
CPC ........ A01G 18/00; A01G 18/20; A01G 18/22; A01G 18/50; A01G 18/64; A01G 18/70; A01G 18/80
USPC .......................................................... 47/1.1
See application file for complete search history.

(56) References Cited

U.S. PATENT DOCUMENTS

| | | | | |
|---|---|---|---|---|
| RE22,202 E | * | 10/1942 | Stoller ................ | C05F 1/005 47/1.1 |
| 4,127,965 A | * | 12/1978 | Mee .................... | A01G 18/00 47/1.1 |
| 5,291,685 A | * | 3/1994 | Romaine ............. | C05F 5/00 47/1.1 |
| 5,934,012 A | * | 8/1999 | Holtz .................. | A23L 31/00 47/1.1 |
| 6,298,598 B1 | * | 10/2001 | Wach .................. | A01G 18/20 47/1.1 |
| 2009/0269441 A1 | | 10/2009 | Beelman et al. | |
| 2010/0223843 A1 | * | 9/2010 | Williams ............. | A01G 7/045 47/1.1 |

FOREIGN PATENT DOCUMENTS

| | | |
|---|---|---|
| CN | 101285042 A | 10/2008 |
| CN | 103184246 A | 7/2013 |
| CN | 103211212 A | 7/2013 |
| WO | WO 2008/109831 | 9/2008 |
| WO | WO 2008/150129 | 12/2008 |

OTHER PUBLICATIONS

51st Annual Penn State Mushroom Industry Conference [Online] Sep. 20-22, 2009, Xenon, "Rapid Vitamin D Enhancement in Mushrooms Using Pulsed UV Light" (Year: 2009).*
Roger Williams, Vitamin D Formation from Post-Harvest Pulsed Light Treatment of Mushrooms, Jul. 30, 2008, Xenon Corporation, pp. 1-4 (Year: 2008).*
Office Action issued in Chinese Patent Application No. 201680070344.7 dated Feb. 3, 2020 with English translation provided.
International Search Report, PCTIB2016/055876, dated Jan. 4, 2017.

* cited by examiner

*Primary Examiner* — Peter M Poon
*Assistant Examiner* — Danielle A Clerkley
(74) *Attorney, Agent, or Firm* — Nixon & Vanderhye

(57) ABSTRACT

Disclosed is a chemical-physical method of producing mushrooms enriched with biologically active substances including steps of isolation and pre-seeding development of the mycelium of a desired fungal species, maturation of the substrate, mycelium sowing and incubation with development of fungal primordia under conditions controlled and assisted by machines and processors designed to adjust temperature, humidity and radiation, development of carpophores, their collection and treatment with pulsed light in order to stimulate the production of vitamin D2. Physical treatment includes exposing the environment to electromagnetic fields (EMF) during all the previous steps the collection, and chemical treatment includes adding the substrate with egg powder. After the mycelium sowing, the substrate is enriched with inorganic trace elements, with a result of obtaining officinal mushrooms that are provided with therapeutic capacities in particular in oncology field and, in general, adapted to counter cell degeneration in a variety of diseases.

6 Claims, No Drawings

METHOD OF PRODUCING MUSHROOMS

TECHNICAL FIELD

The present invention relates to a chemical-physical method of producing officinal mushrooms, and mushrooms produced.

BACKGROUND ART

Typically mushrooms are cultivated in bales or containers of various materials, such as cellulose, sand, loam, according to various methods and results on the final product quality. According to the invention preferably polypropylene containers, substantially bottles, are used, arranged on shelves in technological greenhouses, with intensity of natural or artificial light being adjusted and the humidity and temperature values being controlled as desired. This technique is treated by Rodriguez-Estrada and Royse (2005) in the cultivation of *Pleurotus eryngii*.

SUMMARY OF THE INVENTION

One object of the present invention is to provide a method for a cultivation method that is optimal in yield and quality, but especially suitable to standardize and develop chemically and physically in mushrooms active principles that are in part already present and/or introduced as precursors, such that the amount of such principles is sufficient for the treatment or the prevention of neoplastic/degenerative diseases, starting from an already scientifically proven efficacy.

Another object is to prepare a particular substrate for the cultivation of each fungal species selected according to its ability to counteract the mentioned diseases and to its adaptability to the growth with the aforementioned technique Rodriguez-Estrada and Royse.

Still another object of the invention is to choose varieties of mushrooms adapted to become officinal mushrooms, i.e. selected on the basis of activities that are scientifically proven for the treatment or prevention of neoplastic/degenerative diseases. This method represents an implementation of such activities in terms of standardization of active principles that are efficient for the healthy effect desired.

In order to achieve these objects, the invention proposes a chemical-physical method of producing enriched mushrooms adapted to develop biologically active substances and obtained in technological greenhouses on containers containing pre-measured substrate, comprising steps of isolation and pre-sowing development of a mycelium, maturation of the substrate, sowing of the mycelium of the desired fungal species, incubation with development of fungal primordia under conditions controlled and assisted by machines and processors able to adjust temperature, humidity and radiation, development of carpophores, their collection and treatment with pulsed light in order to stimulate the production of vitamin D2. A physical treatment by electromagnetic fields (EMF) is used in all the steps before the collection, to promote the incorporation of trace elements in the carpophore through the mycelium, as well as a chemical treatment is used by adding egg powder into the substrate, and, after sowing the mycelium, inorganic trace elements. Officinal mushrooms are so obtained that are provided with therapeutic and preventive abilities, which are healthy in a generic sense, such as to be considered functional foods that are likely to belong to the novel food category and able to develop and implement a physiological response of the body against chronic degenerative diseases, in particular cancer.

In particular, the physical treatment allows an increase in the number of the carpophores, an increase of dry mass and humidity, a decrease in production time, and, above all, an optimal organication of the inorganic trace elements; further, the physical treatment permits to improve the metabolism of the substrate and the final quality of the mushrooms. Advantageously, the physical treatment is modulated according to a sequence and consists in the exposure to EMF of 15-25 mT for an interval of 10-20 min/day since the step of isolation and pre-sowing development of the mycelium and for all steps up to the development of fungal primordia, later to EMF of 100 mT for an interval of 2-3 min/day until harvest. This treatment in sequence has shown (Jamil, 2011) that low intensity EMF for long periods of time are useful in the early phases up to the formation of the primordia, while high intensity EMF are needed for the vertical development of the carpophores in a short period of time. Such a treatment allows even in some cases to halve the production time by increasing the mushrooming number.

The egg powder is added to the substrate in a weight ratio within a range of 2 to 3% of the dry weight of the substrate in the container in a manner that the carpophore develops a biologically active quantity of ergothioneine. The ergothioneine stimulates cellular detoxification and antioxidant-inflammatory mechanisms.

The inorganic trace elements comprise a complex selected from the group of salts of selenium, germanium, zinc and copper, which are added in a weight ratio of between 1 and 3‰ of the dry weight of the substrate in the container. The inorganic trace elements are important for the antioxidant antidegenerative and anticancer properties, because they are part of many enzyme-vitamin complexes and stimulate the immune system against cancer and other chronic degenerative diseases.

The pulsed light allows the production of vitamin D2 to be stimulated; the frequency of the light pulses and the time of exposure vary depending on the fungal species with the object of reaching the amount of 2,000 IU of vitamin D2 per serving/day of fresh or dried mushroom which is the antidegenerative and antineoplastic dose according to numerous authors.

The invention also provides a container for the production of mushrooms enriched in biologically active substances in the form of a longitudinal axis cylindrical bottle that is made of plastic material and provided with an upper capped mouth and a bottom and with a lower capped mouth, the bottle being provided with a pair of closable spouts for the passage of liquid.

The spouts are situated in the vicinity of both the bottom and the mouth and are angled towards the bottom and the mouth with respect to the longitudinal axis of the bottle.

The fungal species are chosen, both for their already demonstrated capacity contrasting the neoplastic and degenerative diseases and the adaptability of cultivation techniques used in the present method, from the group of the following twenty species: *Pleurotus eryngii, Pleurotus ostreatus, Lentinus edodes* "Shiitake", *Flammulina velutipes*, conical *Morchella* Parsons, *Auricularia auricula-judae* (L.:Fr.) Schroeter, *Auricularia polytricha* (Mont.) Sacc., *Tremella fuciformis* Berk. Brand, *Agrocybe aegerita, Pholiota nameko, Hypsizygus tessulatus* (Bull.) Singer, *Hypsizygus ulmarius, Grifola frondosa* "Maitake", *Agaricus brasiliensis, Agaricus blazei* Murrill, *Ganoderma lucidum, Coriolus versicolor, Phellinus linteus, Hericium erinaceus, Poria cocos*.

Furthermore, the invention provides the use of mushrooms that are enriched of biologically active substances and standardized, to be intended for use as food (Novel Food), both fresh and dried, and either whole or powdered, in the prevention and treatment of neoplastic-degenerative diseases, since they have functional activity and therapeutic properties in addition to their nutritional capacity. These mushrooms distinguish themselves from the common species for the suffix *officinalis*, (shorter, off.) to be added to the scientific Latin name of the species.

In practice, simultaneously with the physical treatment with variable power EMF, some mineral substances and inorganic trace elements diluted in water reach the bottle in which there is a minimum quantity of compost as a solid substrate, which provides nitrogen and carbon, with addition of egg powder, as a source of cysteine that is precursor of the final product ergothioneine. The solid substrate also contains germanium salts (soluble germanate), selenium (sodium selenite), zinc (zinc hydroxide), and copper (copper hydroxide) at a concentration of 1-3‰ which are incorporated in the structure of the mushroom. The solid substrate, after its insemination with mycelium, is automatically irrigated. In the compost there are commonly by-products of the production of flour, bran, straw, crushed cereals, calcium carbonate etc., each by-product having a carbon-to-nitrogen ratio (C/N) optimal for the fungal species to be cultivated. With the addition of egg powder the content of nitrogen in the compost is between 1.8 and 2%. As soon as the mushroom is collected, it is subjected to irradiation by means of pulsed light Xenon lamp to facilitate the production of ergocalciferol (vitamin D2). The mushrooms so obtained are then in part placed on the market in the usual forms, i.e. fresh, dried or lyophilized, and in part used for the preparation of food supplements.

The final substances as an object of the method according to the invention are produced by physical agents, electromagnetic fields and pulsed light for vitamin D2, or chemical agents, which can be organic precursors, e.g. the amino acid cysteine for the ergothioneine, or mineral inorganic precursors (metals and rare earths) that must be transformed in organic through the enzymatic catalytic activation, in the form of colloidal trace elements. The substances have been chosen on the basis of a careful literature review as the most active in mushrooms in the prevention and treatment in particular of the neoplastic and degenerative diseases in general, and already present in minimal amounts in the considered mushrooms, from which the idea of producing them from precursors and/or concentrate the latter up to relevant levels with a therapeutic action while in a range of absolute food safety.

The ergothioneine is an amino acid with a substantial effectiveness as an antioxidant. It is exclusively produced by the mushrooms from the decarboxylation of histidine and next passage to cysteine, and its ability to act as an antioxidant derives from its sulfhydryl group which when oxidized declines rapidly, because of the uniqueness of the tautomeric structure with half-live of a month that passes quickly from oxidized to reduced in a non-enzymatic manner. This allows the continuation of the antioxidant capacity (cytoprotection) up to one month, in contrast to other natural antioxidants that last up to a few days; above all, especially the mitochondrial DNA, in particular of the cells having a low or null replicative index, such as the nervous ones, is preserved from oxidative stress and from the consequential damages. The ergothioneine then generates cytoprotection and cell stability, especially in cells that have the same half-life, such as red blood cells in which it is often found and for disorders of which it has been proposed as therapy by Hartmen et al., 1988; the ergothioneine preserves other antioxidants of the organism, such as the glutathione, since it oxidizes in place of them; it is not metabolized in any tissue of mammals but specific intracellular transporters have been identified in humans. The presence and the action of sulfur in SH groups gives to the ergothioneine, in addition to the antioxidant property, an anti-inflammatory property as trophic and cleansing of the connective tissue and the liver, with stimulation of the immune system. The ergothioneine then acts at a preventive level in the low-grade chronic inflammation that is believed nowadays the most important cause of the degenerative (neurodegenerative) diseases and the neoplastic diseases. There is no recommended daily intake. The ergothioneine is in all the mushrooms, especially boletes, and its percentage may be increased by the use of powdered egg as soil amendment in a ratio of 1-3% of the dry growth substrate.

Actions and properties of the soil amendments are listed below.

Antioxidant capacities: Se, ergothioneine, Ge
Local cytotoxic capacities: Ge
Antioxidant and anti-inflammatory capacities: ergothioneine
Immunostimulant: ergothioneine, Se, Ge, Z, Cu
Antiproliferative/Pro-differentiating: Vitamin D2
Cytoprotective capacities: ergothioneine
Anti anemic: Cu
Anticachexia: Zn
Anti-cancer of airways: Ge
Support of thyroid function: Se
Cancer prevention: Se, vitamin D2, Zn
Antineurodegenerazion: ergothioneine
Antibacterial/Antiviral: Cu
Skin diseases: ergothioneine, Se, Zn, vitamin D2

All degenerative diseases begin with cellular oxidation, when the latter is not controlled by the various body's antioxidant systems. The antioxidants contained in foods, even if taken in amounts sufficient to reload these systems, such as that of glutathione, could not counteract this action due their short half-life from a few hours to a few days that is often insufficient to repair damaged enzyme systems in particular in heavily stressed and intoxicated organs as those of a chronic sufferer. There is only one natural substance in all mushrooms whose action persists for more than 30 days and that oxidizes in place of other cellular antioxidant systems, for saving them. This substance is the ergothioneine, a typical fungal amino acid.

This substance that is the best existing natural antioxidant since it is persistent, is produced from egg powder, and represents the start, i.e. the primary prevention in acting on the cellular structure by improving the performances (INPUT), onto which all the antioxidants and anti-inflammatory actions of the other amended substances, especially the inorganic trace elements. The ergothioneine implements not only the specific action of the individual inorganic trace elements on the respective bodies/functions, but also favors the general physiological functions of the organism with valence on the immune response. The foundation given by the ergothioneine and inorganic trace elements, is completed by vitamin D2 which is implemented through the pulsed light. The pulsed light acts, at a dose per day of 2,000 IU in the neoplastic/degenerative diseases, by its cellular antiproliferative and pro-differentiation capacity, on the final product (OUTPUT), optimizing the life cycle in stabilizing the DNA. One must not forget that also the production of ergosterol (whose sterol nucleus makes up the structure of vitamin D2) is stimulated by the pulsed light, the ergosterol being also provided with anti-tumor capacities as quoted in literature.

Therefore, from the officinal or *officinalis* mushrooms according to the present invention, there is obtained a unique food capable of countering, from beginning to end, the neoplastic transformation and cell degeneration, thanks to its antioxidant, anti-inflammatory, anti-proliferative/pro-differentiation, DNA cell stabilizing and immunomodulating capacities. This food implements the already recognized anticancer/antidegenerative capacities of the various strains of mushrooms of the present invention, capacities which, to a great extent, are given by polysaccharides (alpha and beta-glucan) and glycoproteins of the fungal cell structure.

The method is embodied in a metabolic action of the mushrooms on substrates enriched of egg powder with the aim of metabolising the precursor amino acid cysteine in the fungal amino acid ergothioneine for stimulating cell detoxification, antioxidant and anti-inflammatory mechanisms in humans.

The method is embodied in the mushroom organicating action that transforms inorganic trace elements (Se, Ge, Cu, Zn) contained in substrates in the form of salts into organic substances, with the aim of enhancing the anti-oxidant, antidegenerative and anti-cancer fungal properties, since the trace elements are part of many enzyme-vitamin complexes, and stimulating the immune system against cancer and other chronic degenerative diseases.

DESCRIPTION OF INVENTION EMBODIMENTS

The invention identifies a category of foods having anticancer and antidegenerative properties both at preventive level and as dietary support or supplement for population at risk of falling ill for familiarity and genetic reasons, or already ill, or at risk of recurrence.

These foods are cultivated mushrooms of which some properties opposing neoplastic and degenerative diseases and stimulating the immune system, are already known. These mushrooms become functional, i.e. they amplify their anti-cancer properties and those supporting a sick body, thanks to the typically fungal ability of biosynthesizing new compounds from precursors or transforming minerals, metals, rare earths, that were added to the growth substrate, into organic substances, that is making them bioavailable. Thanks to the standardization method, and the technology used, these mushrooms undergo modifications improving their healthy abilities as foods, so that they can be called officinal or *officinalis*. In fact, in analogy with the pharmacopoeia of officinal herbs, these mushrooms undergo transformations to an "almost drug" not in a pharmaceutical laboratory where an active principle is extracted, but in technological greenhouses and according to the growth physiology thereof. This transformation does not alter the nature of the starting product, that is to say the mushroom, but broadens the effectiveness of use in the identified population, taking care to provide a product that is standardized, bioactive, safe and effective, as well as good and nutritious. Precisely for these reasons, the officinal mushroom is the food most close to the concept of so-called nutraceuticals, i.e. foods or supplements extracted therefrom, where the healthy aspect arising from a food nutrient is combined with the care ability provided by a pharmaceutical product. It can be said that the mushroom becomes officinal for the marked nutraceutical properties derived from it biosynthetic capacities that amplify the potential capacities of the species, by controlled growth conditions; therefore, the officinal mushroom can be considered a Novel Food, a new food with functional food capacity, as it amplifies the physiological functions and capacities of the organism to react against neoplastic/degenerative diseases.

The cultivation can exploit modularity since it is carried out in individual containers such as the bottles placed in technologically advanced greenhouses, which can be obtained by re-adapted cargo-carrying containers, equipped with automated air conditioning system that is managed by dedicated software to guarantee the respect of a production process.

The production process that is based on instruments such as the bottles described below as well as on automated technologies managed by software, allows the production of various mushrooms with standardization and monitoring features of amended active principles.

Not only mushrooms are useful as a supplement to the diet for these categories of patients, but also are easily absorbable by the integration of vitamin C and vitamin E, and in critically ill patients, they can also be taken as supplements in the form of extracts in capsules or powder, which amplify enormously their therapeutic potential.

In particular, the invention provides teachings on the components used for the preparation of compost which can be: wheat straw, alone or mixed with residues from wood processing, pruning, bran, sawdust, etc.; it is important to add to the compost calcium carbonate in a ratio of 3 to 5% in order to obtain the optimal growth pH for the species to be cultivated. The mycelium generally bred on seeds of Gramineae needs a hole in the solid substrate for insemination. On the contrary, when grown in a liquid medium, the mycelium can be injected into the compost by using a syringe or a gun. In the compost inside the container, in a second time, a mixture of trace elements and salts can be added in order to ensure the maintenance of the optimal pH which allows a considerable simplification of the method. At the start, a metered quantity of mineral trace elements is given that will be gradually absorbed from the mycelium with the growth in polypropylene bottles according to the invention, thus eliminating at the start problems of pH alteration of the substrate due to irrigation with soil amendment. Some salts, with the refinement of the method, may be added with watering. As for the substrate, which varies depending on the fungal species, the most suitable one will be chosen, as taught by Tan et al., 2005, for example made of 72-73% sawdust, 23-25% bran, 1% gypsum, 1% calcium superphosphate, with the addition of the soil amendments according to the present invention. In any case, long components must be shredded into portions of 2-3 cm, and then mixed and maintained moistened to 70% in special equipment known as a mixer wagon. The substrate however prepared is subjected to known treatments with heat in an autoclave at 110-120 C. degrees for 1-2 hours or in an oven at atmospheric pressure for several hours depending on the reached temperature level, e.g. 98 C. degrees, and on the volume of the packs.

As regards the production container, it is a bottle made of polypropylene, preferably 1-litre bottle, with short neck and wide opening to allow the development of mushrooms.

Twenty species of mushrooms have proved effective for the application of the method according to the present invention and having already scientifically recognized anti-neoplastic-antidegenerative capacities: *Pleurotus eryngii, Pleurotus ostreatus, Lentinus edodes* "Shiitake", *Flammulina velutipes, Morchella conica* Parsons, *Auricularia auricula-judae* (L.:Fr.) Schroeter, *Auricularia polytricha*

(Mont.) Sacc., *Tremella fuciformis* Berk. Brand, *Agrocybe aegerita, Pholiota nameko, Hypsizygus tessulatus* (Bull.) Singer, *Hypsizygus ulmarius, Grifola frondosa* "Maitake", *Agaricus brasiliensis, Agaricus blazei* Murrill, *Ganoderma lucidum, Coriolus versicolor, Phellinus linteus, Hericium erinaceus, Poria cocos*.

*Pleurotus eryngii* off.

This mushroom will be particularly focused because the method of cultivation in greenhouses of polypropylene containers started from *P. eryngii* (Rodriguez-Estrada and Royse, 2005). The genus *Pleurotus*, abbreviated below with P., which includes edible commonly cultivated mushrooms with attractive organoleptic properties, has nutritional and functional qualities of great interest. In particular, the *Pleurotus eryngii* possesses a high content of carbohydrates, proteins and dietary fibers, in addition to a low lipid content. All essential amino acids are present with prevalence of glutamate, aspartate and arginine, while the limiting amino acid is leucine. Soluble sugars such as galactose, sorbitol and maltose are traceable in limited quantities. The sodium content is particularly low. As reported in literature, there are also significant concentrations of vitamins (C, A, B2, B1, D, and niacin). Like all edible mushrooms, the high amount of fibers and sterols in addition to low content of fat, sodium and calories, make the *Pleurotus eryngii* a strategic food in the prevention of cardiovascular disease. Cholesterol-lowering and blood glucose lowering properties have been proven. The high quantity and variety of these fibers can contribute to intestinal eubiosis. The proteins in the mushroom have a good biological value and a higher protein amount (1.21 g/100 g of fresh weight) than in *P. ostreatus, Lentinus edodes* and *Flammulina velutipes*. The mineral composition shows a good average content: particularly concentrated is zinc (89.3 µg/g), copper (22 µg/g), iron (29.3 µg/g), sodium (240 µg/g) (Rodriguez Estrada a.e., 2007) etc. However, vitamin D2 is almost absent as well as selenium, but the ability of the method according to the present invention has a remedy to that. In fact, in nature the absorption of metal ions in mushrooms varies depending on the species and the ecosystem in which development takes place, in particular on the basis of acid and organic matter present in the soil (Gast C. J., 1988). As will be seen later, mycelia from strains of different origin are able to absorb a liquid synthetic medium enriched by several inorganic selenium sources ($Na_2SeO_3$, $Na_2SeO_4$ or $SeO_2$) at different concentrations (Baeza A., 2000, 2002, Stajic M., 2006) and to obtain, more than any other mushroom among those examined, elevated concentrations of lead in basidioma (H H Dogan, 2006). This suggests the possibility for *P. eryngii* to be not only an excellent dietary source of micronutrients, but also an efficient environmental pollution indicator. As regards the pharmacological properties, the cholesterol lowering activity is due to mevinolin (lovastatin), a HMG-CoA reductase inhibitor that has good values, from 120.9 mg to 150 mg per kg of dry weight in the fruiting body (Chen S Y, 2012). The work of Mizutani of 2008, was one of the few studies on humans in order to evaluate the reduction of postprandial hypertriglyceridemia in two groups of Japanese (29 people) fed with a high fat meal (40 g), one of the two groups being supplemented with *P. eryngii*; not to mention the blood glucose lowering effects (De Silva D D, 2012; Chen J., 2009; Kim J I, 2010). The fibers, in the form of polysaccharides (beta-glucans), both insoluble and soluble, such as pre- and pro-biotics, contribute to the eubiosis of intestinal microbiota (Synytsya A., 2009; Cheung P C K, 1998; Manzi P., 2000) also essential for the immune response. A tertiary helical conformation of beta (1-3) glucans is deemed important for their immunostimulatory activity (Maeda Y Y, 1988) especially against tumors. For example, derivatives of pleuran, a beta glucan isolated from various species of *Pleurotus*, have shown immunomodulatory and antitumor properties (Karacsonyi S., 1994; Paulik S., 1996; Rop O., 2009).

Highly branched beta glucans of *Pleurotus tuber-regium* and their sulfur derivatives showed potent antitumor activity in vivo and in vitro (Tao Y., 2006). Some alpha-glucans, isolated from mycelium of the mushroom *P. ostreatus*, were able to inhibit the proliferation of colon cancer cells by the induction of apoptosis (Lavi I., 2006). A chloroform extract of *P. eryngii* showed inhibitory effects on mammalian DNA topoisomerase; being purified and identified as Ubiquinone-9, it is capable of inhibiting, by inducing apoptosis, the leukemic cells U937 but not the normal fibroblasts (Bae J S, 2009). As regards the anti-inflammatory properties, an extract of *P. eryngii* has proved to be capable of significantly suppressing degranulation and release of histamine by mast cells, as well as the release and synthesis of IL-4, which is a cytokine capable of inducing the synthesis of IgE and the development of mast cells, and the active signal proteins in the allergic response, by acting on the signal mechanisms mediated by transcription factors NFAT, NF-kB, AP1 and receptor FceRI (Nabeshima Y., 2005; Han E H, 2011; Jedinak A., 2011). A *P. Eryngii* extract has been used successfully in the treatment of experimental atopic dermatitis on animal model induced by DNCB: the inhibitory action on the contact allergy seems to happen by the modulation of the Th1/Th2 response and by the reduction of the inflammatory infiltrated in skin lesions (Choi J H, 2013). In 2001, Wang et al. describe a molecular mass compound of 11.5 kDa that they call Pleureryn with protease activity, able to exert inhibitory effects on the protein synthesis as well as on the reverse transcriptase of the HIV-1 virus. The same authors isolate a peptide with antifungal activity of 10 kDa molecular mass that they call Eryngin and a thermostable ribonuclease, having a 10 kDa molecular mass with antiviral, immunomodulatory and antineoplastic activity (Wang H., 2001, 2004.). *P. eryngii* could have an important role in bone metabolism: a compound extracted from basidioma of *P. eryngii* has increased the alkaline phosphatase activity of the osteoblasts with increased gene expression and secretion of osteoprotegerin and a decrease in bone resorption areas (Kim S W, 2006). From basidioma, Ngai and Ng (2006) have also isolated a haemolysin called Eryngeolysin, monometric, mass 17 kDa, showing cytotoxicity against leukemic cells and antibacterial activity against *Bacillus* spp, without antifungal effects (Ngai P H K, 2006). In conclusion, the antiviral potential of *P. eryngii* is attributed to the antibody xb68Ab (Fu M., 2003). Therefore, the action of *Pleurotus eryngii* is powerful and various: it acts from the diabetes to the hypercholesterolemia, on the cardiovascular system and on the metabolism, but what is most interesting and can be enhanced with the officinal mushroom method according to the present invention, is an immunomodulatory and antiviral-antineoplastic activity, in particular the activity of stimulating the apoptosis of the leukemia cells and of the colon adenocarcinoma.

The method of production of officinal mushrooms is applied in particular to the *Pleurotus eryngii*. The product obtained with the method according to the present invention will be referred to as *Pleurotus eryngii officinalis*, abbreviated with off. Special attention goes to the substrate, a little different than that of the other *Pleurotus*, as it is matured and sterilized separately, consisting of straw and waste wood, with addition of sawdust and mixed in suitable mixers with calcium carbonate additioned with cottonseed meal by 5-10% in order to stimulate the mycelium (Uppadhyay, 1991). The pH should be maintained between values of 4.5 and 6. The bottle should be half full instead of the customary ⅔ and immediately after the sowing of the mycelium on the substrate and the amendment (Se, Ge, Cu, Zn in equal parts in a ratio of 1-2‰ of the dry weight of the substrate and under the influence of the EMF at low power –10-20 mT for 10 min/day) occurs; during the first twenty days, the temperature is maintained at 18 C. degrees and then elevated to 23 C. degrees in the following fifteen days. During incubation, the relative humidity is between 60 and 70% and the $CO_2$ concentration is not more than 3,000 ppm. At the end, from each bottle, the substrate upper part, that is the oldest, is mechanically removed for about 1-2 cm. In order to maintain a proper moisture to the surface of the compound and to favor the formation of the primordia, the bottles can be covered or inverted. During the incubation, the mycelium gradually invades the substrate, until the former permeates the latter thickly, in the form of mildew that generally is white.

Then after a 35-day *Pleurotus eryngii* incubation time (in *Pleurotus eryngii* off. the incubation time decreases by ⅓ thanks to EMF), the bottles are transferred in the cultivation rooms where, after filling with soil up to the usual ⅔ of the bottle, they are kept for 7-10 days at a temperature of 14-15 C. degrees and a relative humidity of 80-90% and with a $CO_2$ concentration of less than 2,000 ppm and an illumination of 50-200 lux. When the primordia begin to differentiate, on the surface of the substrate, the bottles are straightened and the environmental conditions adjusted to values of 16-18 C. degrees, 75-90% of relative humidity, less than 1,000 ppm of $CO_2$ and 50-500 lux of light intensity, and EMF at high-intensity (100 mT) for 5 minutes a day. After about 10-13 days the carpophores are ready to be collected (in the *Pleurotus eryngii* off. this time decreases by ⅓ thanks to EMF) and then they undergo a treatment by prolonged pulsed light to obtain 2,000 IU/day for fresh portion. The production is represented by a single mushrooming. The biological performance, that is the weight ratio between fresh mushrooms and dry substrate, is greater than 70%. Transformation into officinal of the *P. eryngii* aims to implement the already remarkable anticancer and antioxidant capacities by improving the vitamin D2 and selenium content that are deficient in the starting mushroom, notably for the prevention. In consideration of the chronic degenerative nature of the other diseases for which it is indicated and of the particular pleasantness and digestibility as edible mushroom, *P. eryngii* off. can be recommended in the assumption of a daily portion of fresh, for the entire population, especially the elderly and people suffering from chronic degenerative diseases, and especially in those already ill and those who risk to fall ill of cancer for recidivism or hereditary-familial reasons.

*Pleurotus ostreatus* off.

The *Pleurotus ostreatus* off. is the basidiomycete mostly grown in the world and among the most popular for the taste and texture. The research has shown that many other types of mushrooms of the *Pleurotus* genus have more or less the same actions, even if the ability to grow in different environmental conditions and with different types of substrates that the *Pleurotus ostreatus* (P. o.) has shown to know how to metabolize, make it the mushroom of the *Pleurotus* genus with the greatest potential of beneficial changes through the officinal mushroom method. From a nutritional point of view the P.o. contains (by dry weight): proteins 10-30%, vitamin C 30-144 mg/100 g, niacin 109 mg/100 g, folic acid 65 mg/100 g, high amount of potassium 306 mg/100 g. In particular, the cholesterol-lowering action of the *Pleurotus ostreatus* is exploited that is due to a molecule of similar behavior to that of Lovastatin (Gunde-Cimerman et al. 1993-1995). In common with the *Pleurotus eryngii*, the *Pleurotus ostreatus* has the ability to stimulate the immune system and a remarkable anti-cancer activity. It was found that, thanks to a protein and a polysaccharide, the *Pleurotus ostreatus* can inhibit the development of sarcoma 180 inductor of murine tumors and can act against the human prostate cancer (Zhuang et al., 1993; Zhang et al. 1994; Gu and Sivam, 2006). The studies have been performed in laboratory animals on tumor cell lines, although lacking references to human clinical trials. Therefore, the action of the *Pleurotus ostreatus* off. on tumors is general on the immune system and, in particular, can be on the prostate cancer.

The cultivation method of *Pleurotus ostreatus* off. is much simpler than that of the *Pleurotus eryngii* before mentioned, with some precautions: the temperature during incubation should be maintained at values close to 30 C degrees and lowered to 25 C. degrees in 35 days, being a mushroom that grows well even at low temperatures. During production, the substrate must have a moisture content of about 70-75% with air humidity around 95-98%, at an optimal temperature of the carpophores of 14-16 C. degrees. Production takes place at various times or mushroomings (2-3) separated by 10-20 days, running out within 60 days; in the production in bottle there is only one mushrooming but it is faster thanks to the EMF. The matrix of the substrate must be rich in cellulose and lignin and is a poor substrate with a C/N ratio of 500. All the elements mentioned above (finely chopped straw, sawdust, bran, etc.) can be used, but substances, as ammonium nitrate (2-3%), soybean meal (10%) and alfalfa flour (10%), with a nitrogen content between 0.8 and 1.5% fully given by egg powder, must be added in a specific way for this kind of mushroom. In order to obtain a proper pH, 5-10% calcium carbonate is mixed with the mass with an optimum growth pH between 6 and 6.5. According to the invention the substrate is enriched with 2-3% egg powder simultaneously with the provision of the low-power EMF. The salts are inserted into the bottle 2-3 days after sowing of the mycelium and the beginning of incubation and, given the poor specificity of absorption of a single trace element, the mineral amendment is administered according to the proportion of 1-2‰ dry mass with an equivalent percentage of each (Se, Ge, Cu, Zn) of 25%. The production process follows the standard procedures (with the exclusion of the addition of the soil as for the *Pleurotus eryngii*) including the exposure to EMF of the high-power and the post-harvest pulsed light.

Starting from a condition of high percentage of vitamin C contained in the mushroom, the transformation into officinal allows to exploit the antioxidant and immunity stimulating synergistic effect thanks to the trace elements, widening the use in many degenerative diseases as already said for *Pleurotus eryngii*. There is a further result that, thanks to the good dosing, there is no need to take a supplement of vitamin C (which makes it even more effective in contrasting the tumor in the quality of phyto-funginus complex). Further the *Pleurotus ostreatus* has the usual digestibility and pleasantness that make it the officinal mushroom to be consumed also in large quantities by all and in all days.

*Lentinus edodes* off.

The *Lentinus edodes* (Shiitake) is the mushroom most widely used in medicine for cancer patients. The polysaccharide lentinan is the most famous and used, even in the pharmaceutical form, among the compounds with biological response modulating activity (BRM). This glucan is one of the components of the fungal wall, and is extracted either from the carpophores, with a higher yield, or by the mycelium. The lentinan is a high molecular weight polysaccharide composed by glucose monomers linked together by Beta-1,3 glycosidic bonds and with the presence of lateral branching B 1,6 every 5 linear residues (Aoki, 1984). The lentinan is extracted in hot water (90-95 C. degrees) for 12 hours and then purified. The lentinan is able to restore or increase the capacity of the host's immune system, to respond to lymphokines and cytokines stimulating proliferation, differentiation and maturation of lymphocytes such as B and T and NK against viral pathogens or tumors (Chihara, 1990). The aqueous extracts of L. edodes are able to counter the proliferation of sarcoma 180 cells in vitro and also in vivo (Chihara et al. 1969, Wasser and Weiss 1999 etc.). Suga et al. (1984) have demonstrated the ability of lentinan to prevent oncogenesis and to inhibit the formation of metastases (Suga et al., 1989). The administration of lentinan also induces the release of active compounds by the host cells as the vascular dilation factor (VDHF), interleukin 3 (IL-3) together with other IL and the cell growth stimulating factor (CSF). These molecules may interact with lymphocytes and other cells to stimulate the inflammatory and immune response (Maeda et al., 1984). Mizuno et al. in 1995 have shown in vivo the bond with T B and NK lymphocytes. Macrophages activated by lentinan produce smaller amounts of prostaglandins IL-10 and IL-6, and the CD4 T lymphocytes increase the production of IFN factor and decrease IL-4. Further the production of nitrous oxide (NO) is stimulated by macrophages. Oral administration of lentinan in vivo induced in laboratory mice a strong antitumor activity due to the increase of the level of different lymphokines (Yap and Ng, 2003). Other studies indicate that lentinan is not only useful in the treatment of tumors associated with traditional treatments (CHT), but also protects the chromosomes from damage caused by chemotherapy (Hasegawa et al., 1989) or by mycotoxins (Ricordy et al., 2004). Extracted by carpophores has been another polysaccharide, L-II, a D-glucopyranose, which stimulates the immune system similarly to lentinan (Zheng et al., 2005). Obtained from the extraction in water of the sole mycelium are mixtures of polysaccharides called LEMs that possess anticancer, immunostimulating and antiviral activities (Wasser and Weiss, 1999). One of the components of the LEMs, called EP-3, has a structure similar to the lignin (single molecule of the group identified in a mushroom) capable of inhibiting in vitro the replication of many viruses, including HIV (Jones, 1995). Identified in the mycelium have been antioxidant compounds such as thioproline, an amino acid deactivator of nitrite radicals that form nitrosamines as other extracts that inhibit aflatoxins and mycotoxins implicated in the development of some cancers (Fanelli et al., 2000, Ricelli et al., 2002, Reverberi et al., 2005). The L. edodes contains a good amount of ergosterol and vitamin D2 and amino acid eritadenine that increases the cholesterol metabolism by converting LDL in HDL. Suggested in popular medicine is the consumption of a small cup per day of a wrung extract in cold water for one night (10 fresh carpophores or 10 g of dried carpophores in 600 cc of water). In view of the already strong immunostimulatory action due to lentinan, the officinal form Lentinus edodes off. will have even more accentuated action of stimulus on the immune system. Therefore, its use as an immunoadjuvant to chemotherapy is recommended, as already done in Japan, and/or in tumor advanced phases and neoplasias that involve the immune system such as lymphomas and leukemias.

The composition of the Shiitake is characterized by a reduced content of dry matter, an average value of protein and a low content of the other elements that are part of the dry matter when compared with P. eryngii. Main amino acids such as glutamic acid, aspartic acid, alanine, leucine and serine are in the protein fraction. In the average composition, the percentage of dry matter is 7.66%, protein 21.73%, fat 1.66%, fiber 6.12%, ash 7.41%; the content of chitin is low (5.84%) but still higher than the P. ostreatus (4.86%) and P. eryngii (4.77%). High content expressed in mg/kg dry matter (DM) for copper (40.7), iron (40.6) and manganese (19.50), while the amount of potassium, phosphorus and aluminum is reduced. The content of vitamin A (31.10 µg/kg of DM) is equal to the average content in mushrooms, while the content of vitamins B1, B2 and B6 is modest like in all mushrooms living on wood. Good is the content of vitamin C (94 µg/kg DM) as well as that of vitamin D2 and D3 (respectively 90.5 and 200.5 µg/kg DM) (Lelley and Vetter 2005).

As for the production, there are peculiarities to be highlighted:

1) The preparation of the substrate: fresh wood sawdust mixed with residues of grain processing, corn etc. is used. For example, Stamets on 2000 provides the following formula (hardwood sawdust 52%, shavings 25%, rice bran or wheat bran 20%, CaSO4 3%, humidity 60%), but the sawdust has to ferment in bed while being wetted and mixed periodically, at a controlled temperature, for several months in order to make uniform the mass and to remove the volatile compounds that are harmful for the mycelium (Oei, 2003): then the other compounds have to be added in the mixer wagon at controlled humidity and pH (between 4.5 and 6). In the final phase before insertion into the bottles the substrate must be mixed with the egg powder (2-3%), compacted and finely crushed and then sterilized in autoclave on suitable baskets at 121 C. degrees for 2-3 hours (Choi 2005).

2) Sowing, lasting 2-4 weeks: it shall be performed with mycelium (2-3% of the wet weight of the substrate) bred mainly on sawdust, introduced with a special gun to the high part of the bottle and in perfectly aseptic conditions, with the neck of the bottle being left open. In this phase the insertion of amendment soil trace elements shall also be carried out in equal parts (2-3‰ of the substrate dry weight of the).

3) Incubation, which is divided into four phases:

a) Substrate colonization: the mycelium invades the compost maintained at an average temperature of 25 C. degrees, with weak illumination or dark and high humidity inside the bottles (90-95%).

b) Formation of a plectenchyma, lasting 2-4 weeks: the mycelium grown up with an increase in $CO_2$ is organized like a compact white fabric.

c) Formation of glomeruli caused by an increase of $CO_2$ and temperature: the mycelium forms small clusters of hyphae.

d) Browning, namely further thickening of the film to obtain a tough consistency and reddish-brown color: $CO_2$ decreases and primordia are formed. The last two phases last 2-4 weeks.

4) Primordia and development of basidioma. Necessary for the appearance of primordia is a change of the environmental conditions. The temperature must fall below 20 C. degrees and a high relative humidity (85-95%) must be maintained reduced with a suitable ventilation. The $CO_2$ must be less than 1,000 ppm, and an illumination of 500-2,000 lux (370-420 nm) must be applied. After 5-7 days, the temperature must be raised above 20 C. degrees with humidity between 60 and 80%. In the period of 7-14 days the mushrooms first grow in height, then their cap goes dark and extends. This production varies from 15 to 35% of the wet weight of the substrate (Oei, 2003) and two mushroomings can be obtained with the bottles. This technique with the plastic bottles is used in China from the '80s (Fan et al. 2005). The process can be speeded up, with half the time, through a careful choice of the variety of Shiitake and adjusting carefully wetting, ventilation and temperature sometimes at alternating values (15-20 C. degrees) by allowing to reduce the production cycle to about 3 months; of course, automated equipment and air conditioned cultivation environments shall be used. The use of EMF as a practice (low intensity until the primordia and then high intensity) can further reduce production cycle times.

The *Lentinus edodes* can undergo the treatment according to the method of the present invention and thus become *Lentinus edodes* off. It is much more active thanks to the ergothioneine and the mineral amendment that are deficient in *Lentinus edodes*. The patient will take it cyclically for two weeks every month and then replace it with other mushrooms for the intense immunostimulating activity that cannot be continued beyond the physiological ability of the organism.

*Flammulina velutipes* off.

The interest of Japan around the properties of mushrooms, which resulted in a big development of consumption and use of mushrooms as a functional food in that country, in particular in the prevention and treatment of cancer, is due precisely to the *Flammulina velutipes* (F.v.). In fact, in Nagano province around the '70s it was verified that farmers, who produced and consumed directly these mushrooms, had a lower incidence of cancer in the stomach on the contrary of the rest of the population in the country. It is necessary to remember that at that time (in the '70s) Japan was the country with the highest incidence in the world of stomach cancer. Strong epidemiological evidence of this, the Japanese health authorities began to stimulate the consumption of mushrooms and successive scientific research has shown the presence in this mushroom of a polysaccharide called FVP that has proven effects against sarcoma 180 of mice (Jiang et al., 1999), so that in the space of little more than twenty years the incidence of stomach cancer in the Japanese population was reported to that of other industrialized countries. Further immunomodulatory effects due to polysaccharides and proteins isolated from *F. velutipes* were discovered (She et al., 1998, Wang Y. T. et al., 2004; Liao et al. 2006). Other studies have identified in the mycelium of this mushroom the presence of different proteins that are able to inhibit the function of ribosomes, thus blocking protein synthesis (Ng and Wang, 2004), to prevent the angiotensin activity (Kim et al., 2002), to inhibit allergic reactions to food in laboratory mice (Heish et al., 2003).

This mushroom is widely consumed in the Far East both as fresh mushroom and as nutraceutical, in the West its properties are unknown and it is not consumed probably because of the poor consistency of the meat and the lubricity of the cap. The nutritional content is variable and strongly influenced by the growth substrate, and this makes the *F. velutipes* one of the mushrooms with the most unexpected results for the amendments added to the growth substrate; however, in the untreated mushroom raw proteins vary from 17 to 31%, fat 1.9 to 5.8%, fiber 3.7%, ash 7.4%.

The polysaccharides of F.v. are the components that stimulate immunity and that have been proved active in the cancer; the reinforcement in the officinal form may be used in all solid tumors and in particular in that of the stomach.

For the substrate, it is preferable the use of coarse sawdust as it improves the softness of the substrate (80%) coming from leaf deciduous wood species (oak and beech) with subsequent fermentation, by wetting and drying it repeatedly in the course of 4-5 weeks. The sawdust is added with 20% rice bran and 1-3% $CaCO_3$. The humidity is adjusted in a range of 58-60% with a pH of 5-6 (Oei, 2003).

The following phases can be distinguished:

1) Packaging and sterilization. After thorough mixing of the substrate together with the egg powder added always in the range of 2-3% of the dry weight, the substrate is placed in 1,000 cc polypropylene bottles with short and wide neck. The bottles are then closed with a cap provided with a filter for the gaseous exchanges and sent to sterilization in autoclave at 121 C degrees for 1-2 hours.

2) Inoculation and incubation. When the substrate temperature has reached 20 C. degrees, the substrate is inoculated using mycelium grown on sawdust, by the known gun for an amount in the range of 2-3% of its weight. After a day, according to the method of the invention, the mineral amendment is added in the same proportion (25%×4) and 2-3‰ with respect to the dry weight. The trace elements are added in a greater percentage for obtaining a bigger immunostimulatory effect combined with the polysaccharide for tumors. Obviously, the action of EMF starts normally. The bottles are then placed on shelves in an environment devoid of light and at a temperature of 20-25 C. degrees. The incubation period is considered over when the substrate is crowded almost totally with mycelium generally after 20-30 days (less with EMF).

3) Production. After incubation, the bottles are placed in a production environment where temperature, ventilation and humidity can be controlled. Here they are opened and the upper part of the substrate, where the inoculum is present, is removed to promote the formation of primordia in a compact and uniform way. The temperature is reduced to 10-12 C. degrees, humidity 80-85%, in the absence of light and in the presence of a high percentage of $CO_2$ (2,000-4,000 ppm). In these conditions, after 10-14 days, the primordia are differentiated, and the temperature decreases by 3-5 C degrees for 5-7 days for a proper growth. After the stem has reached approximately 2 cm, the temperature is elevated to values of 5-8 C. degrees, the percentage of $CO_2$ is kept high and the humidity at 60-75% with an intensity of very faint light, of just 20-50 lux. When the carpophores protrude from the edge of the bottle of 2-3 cm, a sleeve shaped collar is applied to the bottle. This collar favors the lengthening of the stems, the upright position and the accumulation of $CO_2$. When the carpophores reach a length of 13-14 cm, the production is ready to be collected and then treated with pulsed light. The mushroomings are generally two for a total of 160-220 g per bottle (Oei, 2003). Being F.v. a winter mushroom, the parameters (temperature, humidity and $CO_2$) can be modulated even towards low temperatures (10-16 C. degrees), high humidity (90-95%) and reduced $CO_2$ (0.2-0.4%) allowing a first harvest after just 5-8 days.

Given the lack of consistency of the meat in F.v. at low presence of BRM and trace elements, it is possible that the mineral part of the amendment, added at a higher percentage and together with the development of vitamin D, is particularly active in the F.v. off., so that an officinal mushroom with important details and features can be obtained. F.v. is an easily digestible mushroom and the officinal form will allow an easy absorption of biological response modifiers (BRM) and trace elements, such as to make the F.v. the main mushroom for some cancer patients among the officinal mushrooms, since it can be taken daily.

*Morchella tapered* off. (Parsons)

The *Morchella* is an ascomycete, and in the first phase, in addition, there is the need to form sclerotia that represent the vegetative potential germinating form. Being an ascomycete, the *Morchella* develops internally, during the first phase of the accumulation of nutrient (symbiotic phase) for the formation of the germinative button (sclerotium), on a traditional substrate formed by 70-80% plant sawdust, 20% rice or wheat or oat bran, and 2% $CaCO_3$ for pH adjustment to 5.8-6.2. 2-3% egg powder must be added to the substrate. Ascomycetes are immediately sown on that substrate; 18-21 days after, the sclerotia are to be removed and washed and inserted in the bottles with a thin layer of peat and above substrate 50% each in the presence of mineral amendment at the usual proportions (25%×4) with the ratio of 2-3‰ of the dry weight of the substrate. At the same time treatment with EMF begins. In 12-36 hours, the mycelium (saprophytic phase) will spread into the bottle. At this point the development of the mushroom will occur at the expense of the sclerotium and will grow in height where the source of light is more intense and in appropriate conditions of humidity and temperature, in 20-30 days for the completion of the carpophore (half the time with the EMF). Being the *Morchella* an ascomycete, it is possible that the procedure with pulsed light lamp does not give the desired results with respect to vitamin D2. It represents a not easily cultivable, but delicious mushroom and with the following nutritional content: 20% proteins, 4.8% fat, 8.7% fibers, 64.4% carbohydrates.

Alcoholic extracts of liquid cultures of *Morchella esculenta* mycelium have shown anti-inflammation, antitumor and immunostimulatory activities (Nitha et al., 2006). In particular, the mushroom seems to have the ability to lower the excess uric acid (anti-gout). The officinal form may implement the activities mentioned above, in particular the anti-inflammation one; that is the reason why the egg powder is added in a greater percentage.

Being *Morchella* a mushroom poor in trace elements and ergosterol, it is possible that this procedure implements also anticancer properties in addition to already high anti-inflammation and uricosuric properties. *Morchella* is considered an excellent tasty and easy to digest edible mushroom and will maintain these characteristics also in officinal form.

*Auricularia auricula-judae* off. (L.:Fr.) Schroeter

*Auricularia polytricha* off. (Mont.) Sacc

Cultivation of *Auricularia* has its origins in the East in 500-600 b.C., where it was and is appreciated for both its culinary and therapeutic uses. The nutritional content includes: 8-10% proteins; 0.8-1.2% fat; 4-7% ash; 84-87% carbohydrates; 9-14% fibers. A high content of carbohydrates should be noted. The two types of mushroom are substantially similar with respect to the cultivation and properties.

The substrates are generally made from cotton seeds, cereals, bran or deciduous wood logs; generally, species of the Fagaceae family are preferred.

The substrates can be composted for a few days or used directly after mixing.

In both cases, they are placed in heat-resistant polypropylene bottles and sterilized for 60 min at 121 C. degrees.

The composition of the composted substrate is as follows: sawdust (78%), bran (20%), $CaCO_3$ (1%), sucrose (1%). The whole is mixed, wetted and arranged to form a large heap that is covered with a plastic sheet and stirred for two times at intervals of two days.

The composition of the composted substrate is the following: cotton seed scraps (93%), wheat bran (5%), sucrose (1%), $CaCO_3$ (1%).

In both the mushrooms egg powder is added (2-3% of the dry weight); water is also added to obtain a moisture content of 60%, and then the substrate is put inside heat-resistant containers.

After the substrate has cooled, it is inoculated with mycelium and incubated at 25 C. degrees±2 C. degrees for about 28-30 days: on that occasion the mineral amendment is inserted into equal parts (25%×4) and with a percentage of 1-2‰. Soon after, low and then high intensity EMF is applied.

An early formation of primordia can be due to exposure to light greater than 500 lux during incubation.

*Auricularia* is a mushroom that it is suitable to the transformation in officinal, except with respect to the formation of vitamin D which remains very poor.

It has anticoagulant properties, and a polysaccharide fraction has hypoglycemic effect on diabetic mice (Yuan, 1998). Given the high content of polysaccharides, many of the anticancer properties demonstrated on Sarcoma 180 (Kio, 1991) and Ehrlich carcinoma (Ying, 1987), seem to be attributable to them. For the low amount of vitamin D produced, it is inevitable that the implementation of the anti-tumor properties passes through the immune stimulation with an increase of percentage of mineral amendments and egg powder. Also, the officinal form, thus produced, retains the characteristics of pleasantness and the indication in the feeding of all days.

*Tremella fuciformis* off.

The *Tremella fuciformis* is an excellent edible mushroom that can be eaten fresh or dried in infusions using 15 g twice daily thereof (Hobbs, 2000). The mushroom, in addition to contain many vitamins and minerals, is rich in copper because it has the ability to accumulate the copper from the growth substrate. The content of nutrients in dry is 4.6% protein, 0.2% fat, 1.4% fiber and 0.4% ash. In the traditional Chinese medicine, it is used, perhaps for this reason, for hemorrhoids and all types of bleeding; in Europe for abscesses, abdominal pain, heart problems and immune system deficiency. Being also rich in adenosine, the *Tremella fuciformis* is used for vascular thrombosis and in general for cardiovascular diseases also for lipid-lowering, anticoagulant and platelet antiaggregating actions. Antidiabetic effects in laboratory mice are cited (Yuan et al., 1998; Takeujchi et al., 2004). The antitumor capacities (Misaki et al., 1981; Ukai et al. 1983) are due to stimulation of leukocytes and the strong antagonistic antioxidant action on free radicals through the activation of the enzyme superoxide dismutase (SOD) (Cu—Zn) in the liver and brain. They are therefore suitable for such tumors in consideration of the starting concentration of copper (Cu) and zinc (Zn) added as an amendment; then to add a mineral based on copper to the substrate maintains a high level of activation of SOD, adding antioxidant capacity and stimulus to the immune system against tumors.

In nature, the *Tremella fuciformis* grows as a saprophyte on the wood of many hardwood species, especially in tropical and sub-tropical climate regions; its cultivation is not widespread, but also its use to culinary purposes, as well as medicine, is taking the field.

The *Tremella fuciformis* can also be cultivated on natural logs but cultivation is very widespread on synthetic soil, inoculated with a mixed culture in which there is also the ascomycete *Hypoxylon archeri*, often associated in nature to the decaying wood. The compound is made from sawdust of plants (78%), rice bran (20%) and $CaCO_3$ (2%) for a pH 5.8 to 6.2 with the addition of egg powder (2-3% dry weight).

*Hypoxylon archeri* increases the ability of *T. fuciformis* in the assimilation of nutrients in the substrate, so it has a positive effect also on yield. The supplemented substrate is put into the bottles with the upper cap opened but covered with breathable fabric. The substrate is sterilized, cooled and inoculated with the mixed culture together with the mineral amendment with a percentage of 2-3‰ of the dry weight of the bottle with a ratio of trace elements that favors Zn and Cu that are 70% of the total mineral amendment. If necessary, a ventilation will be ensured to the bottles also through the opening of the lower breathable cap. The exposure to EMF begins at doses according to the method.

After about 30 days of vegetative growth at an optimal temperature of 25-28 C. degrees and high humidity (85-95%), the substrate is exposed to conditions favorable to the development of the primordia. These conditions are created with a reduction of the environment temperature and humidity, and an increase in exposure to air and light (temperature of 20-25 C degrees, 80-85% humidity). Mushrooms are harvested after 35-40 days after inoculation, when they have a diameter of 10-15 cm. With EMF times are shortened by about ⅓. With the pulsed light the vitamin D2 increase is not very marked, given the type of mushroom (ascomycete).

In the untreated mushrooms, fresh carpophores have a very high water content (92-94%) and the vitamin content is poor and so is that of mineral elements (Chang and Hayes, 1978). These conditions are completely upside down in the officinal mushroom in which, although the water content remains high, the mushrooms are enriched in amendment trace elements, especially Zn and Cu ions for the action on the immune system.

The officinal properties of this mushroom are attributable to its high content of polysaccharides, in particular to a hetero acidic polysaccharide called glucuronoxylomannan. Such a polysaccharide exerts immunomodulatory and antitumor activity: clinical studies have showed that the mushroom is effective in the management of leukopenia during chemotherapy and radiotherapy (Smith, Rowan and Sullivan, 2002). In particular, the production of interleukins is stimulated (Ukai et al., 1972, Misaki and Kakatura 1995). The known trophic effect on the skin, for which the *Tremella fuciformis* is used in the Far East in aesthetic medicine since many years, is due to the protection of vascular endothelial cells against radiations as well as to the stimulus to ematogenesis, both being used also for damage from chemotherapy and radiotherapy (Stamets 2000). The officinal transformation stimulates the already powerful immune action mediated by leukocytes and interleukins through ergothioneine+trace elements complex (Zn+Cu).

*Agrocybe aegerita* off.

The *Agrocybe aegerita* is a mushroom among the most popular for the taste and the most cultivated in the world. It is commonly known as pioppino and is a saprophytic species. It has a good number of vitamins, in particular D, and trace elements.

The very easy cultivation technique is substantially similar to that of the previously mentioned *Pleurotus*, with sterilization of the substrate in polypropylene bottles in autoclave at 121 C. degrees for 2 hours.

The substrate is that of *Pleurotus*, formed by 70-80% wheat straw, 10% wheat bran, integrated with 2% $CaCO_3$, 2% ammonium nitrate, and 8-10% lucerne meal or other; mixture added with egg powder in the ratio of 2-3% of the dry weight.

After sterilization, the bottles are inseminated using a mycelium raised on caryopses of grain, and the next day the mineral amendment is added at a proportion of 1-2‰ according to a ratio balanced at 25%×4 among amendment trace elements. Then the substrate is subjected to EMF according to the method and allowed to incubate in the dark, in air-conditioned environment at a temperature of 25 C. degrees for 3 weeks. It is important that a percentage of humidity of 70% is ensured.

At the beginning of the fourth week, the temperature is brought to 13-18 C degrees with 90-95% air humidity for fruiting during which the $CO_2$ content must be less than 1,500 ppm and a 12 h/day light cycle with a 500-1,000 lux intensity must be applied. After about 30-35 days since the inoculation, the primordia appear that will be ready for the harvest after a few days. The times with EMF are shortened up to 50% per cycle. Given the already good base for vitamin D2, the enrichment process by pulsed light will get the desired results of 2000 IU for fresh portion/day.

*A. aegerita* until a few years ago was considered a mushroom with little officinal properties, but recent studies have identified the presence of lectin therein. The lectin is a class of proteins capable of binding carboxyl domains of glycoproteins which play a role in the immune response, but also in the recognition of blood groups and in removing toxic glycoproteins in the circulation; *A. aegerita* has anticancer and antiviral properties demonstrated against plant viruses, called AAL (Zhao et al., 2003, Yang et al. 2005). The antitumor action appears to be due to the stimulation of the host immune system and in particular to the stimulation of the tumor necrosis factors (TNF) and interleukin-1 beta (Wang et al., 2004, Yang et al., 2005). The enrichment obtained in the officinal mushrooms produces effects against all tumors in elevating the immune response with that resulting from antiproliferative vitamin D, maintaining a good digestibility and a taste of the meat which makes it one of the officinal mushrooms that can be taken continuously by all patients.

*Pholiota nameko* off.

*Pholiota nameko* off. is a mushroom of excellent quality belonging to the Strophariacee family, much appreciated in the Far East but unknown, perhaps because of its viscosity, in the West where it has found no interest. It is eaten fresh or preserved in jars.

It is a very interesting mushroom for its composition. In fact, the dry substance has 20.8% protein, 4.2% fat, 66.7% carbohydrates, 8.3% ash and 6.3% fiber. The vitamin content expressed in mg per 100 g of dry matter is remarkable and is represented by thiamine (18.8), riboflavin (14.6) and niacin (72.9). The main mineral elements are calcium, potassium and iron (Stamets 2000). The good fullness and richness of the mentioned components, primarily sulfur amino acids, make it one of the mushrooms where the addition can have the most unexpected and glamorous effects, especially of the ergothioneine.

The cultivation technique is analogous to that of *Flammulina velutipes*. One of the most widely used substrates is that formed from sawdust and shavings (52% and 25% respectively) of appropriate plants, wheat bran or rice (20%) and calcium sulphate (3%), with humidity at 70%, mixed and added to egg powder with a significant change compared to the previous mushrooms. The egg powder is in fact 4-5% of the dry weight. All this in order to transform *Pholiota nameko* into the mushroom with the most outstanding officinal capacities, particularly detoxifying, anti-inflammatory and antioxidant capacities due to the ergothioneine, which enhance the anti-infection qualities of the starting mushroom. After packaging in bottles according to the invention and sterilization of the substrate, sowing is effected with mycelium reared on wheat caryopses, and the day after with inoculation of the mineral amendment in the proportion of 2-3‰ and with an equal ratio of the components (25%×4). Then, after exposure to EMF according to the method, the incubation in the dark lasts about 2-3 weeks at a temperature of 25-28 C. degrees. The production is obtained by opening the bottles, maintaining high relative humidity (98%) and lowering the temperature to 10-15 C. degrees for the autumn varieties and to 18-22 C degrees for the summer varieties and providing a light intensity of 300-1,000 lux (Demas, 1989). After about a week the primordia appear, and after a few days they are ready for the harvest; with the EMF, there is a relevant shortening of the times. A second mushrooming can occur by scraping the neck, possibly inserting a semi porous membrane, inverting the bottle after removing the bottom plug and using the second tap for irrigation. In doing so, the production will be equal to 30% of the weight of the compound.

Some authors (Bianco Colletto, 1981) report antibiotic effects against *Bacillus subtilis* and other bacteria. Stamets in 2000 shows that some Chinese authors obtained results of antibiotic effects on bacteria of the genus *Staphylococcus* and antitumor activity against sarcoma 180 of mice. With the transformation into officinal mushroom, as already mentioned, anti-inflammatory, antioxidant and detoxifying capacities of the ergothioneine are implemented with possible indication against tumors from environmental or occupational chemical exposure, the relative intoxication with hepatic degeneration and also in some tumors of the bladder, liver and nasopharyngeal tumor.

*Hypsizygus tessulatus* off. (Bull.) Singer
*Hypsizygus ulmarius* off. (Bull.) Redhead They are a group of well-known mushrooms, appreciated in the Far East, in particular cultivated in Japan, very similar for growth characteristics to the genus *Pleurotus*. They belong to the family of the Tricholomatacee. They have similar characteristics, also of growth, and are consumed fresh, dried or powdered. There is no particular information about the composition.

The cultivation in Japan already happens in polypropylene bottles. The substrate has common features with that of other lignicolous mushrooms: 52% sawdust, 25% chips, 20% wheat bran, 3% $CaCO_3$. The mixture is moistened to 63/65% and mixed with 2-3% egg powder.

The bottles according to the invention are filled mechanically. The substrate is compressed and a hole is applied on the bottom of the bottle where the mycelium is sown. The next day on the same hole, but in a higher position, mineral amendment is added in the proportion of 1-2‰ with an equal ratio of the four trace elements; immediately the substrate is exposed to EMF as normal. Incubation of *H. tessulatus* is made in dark rooms, at a temperature of 20-25 C. degrees for about 30-45 days. At the end, the bottles are opened and the formation of primordia is favored by scraping the surface of the substrate, by lowering the temperature to 10-15 C. degrees, at a relative high relative humidity (98-100%), by a $CO_2$ content less than 0.1%, by illumination of 500-1,000 lux for about 7-12 days. At the end, the temperature is raised to 13-18 C. degrees, the relative humidity is slightly reduced, but the $CO_2$ content is raised to 0.2-0.4%. As for the *Flammulina* v., in order to favor the development of the long stem, a 7-8 cm collar is applied to the bottle neck. The production is obtained in two mushroomings equal to about ¼ of the substrate (Stamets 2000) and can be accelerated by the EMF. In the cultivation of *H. ulmarius*, if the collar is eliminated, the growth of the cap is encouraged. Such a growth is generally inversely proportional to the length of the stem, with a result of getting shorter, squat and fleshy stems with larger caps. In this way, the organoleptic characteristics of *H. ulmarius* are better and the healthy ones remain substantially unchanged.

This kind is related to the genus *Pleurotus*, and some officinal properties are common (see *P. ostreatus*). Stamets (2000) reports Japanese studies on the strong anti-tumor properties of these mushrooms. Some studies report hybridization techniques between *Hypsizygus* and *Laetiporus sulphureus* for the production of medicines against thrombosis (Okamura et al., 2000).

As regards anticancer therapeutic strategy of the officinal mushroom, reference can be made to what has been said for *P. ostreatus*. In particular, the aim is to implement antioxidant, anti-inflammatory and detoxifying capacities of the ergothioneine produced in good quantity.

*Grifola frondosa* off. "Maitake"

It is the most important edible and most studied mushroom with regard to its officinal properties for tumors. It is an important and worldwide appreciated mushroom for its organoleptic properties even before those anticancer, albeit significant. The cultivation technique developed in the late '70s in Japan, along with the search results all over the world on its anticancer abilities and the resulting popular benefits, has allowed the rapid success of this mushroom in markets around the world both as a food and a nutraceutical.

*Grifola frondosa* off. "Maitake" has in the composition unique features such as a moisture content (80%) lower than that commonly found in the majority of mushrooms (90%). The protein content is very high, amounting to about 27% of dry matter, that of carbohydrates is close to 50%. The vitamin content as a percentage of dry matter is 1.5 mg vitamin B1, 1.6 mg vitamin B2, 54 mg niacin, 63 mg vitamin C and 410 IU vitamin D (it reaches the recommended daily dose according to WHO). The content of minerals and metals is magnesium 67 mg %, iron 0.5 mg %, calcium 11 mg % and phosphorus 425 mg % (Stamets and Chilton, 1983).

The cultivation technique adopted is that of sterilization of the substrate in polypropylene bottles. The formulation of the substrate used is that indicated for the lignicolous mushrooms: sawdust 52%, shavings 25%, wheat bran 20%, calcium carbonate or sulphate 3%. The humidity is increased to 60-65% and the pH to 5.5-6.5. To this the egg powder is added in a ratio 2-3% of the dry weight of the mixture. The gross elements such as chips are needed to keep the mixture soft and airy. The substrate after autoclaving is sown in bottles with mycelium grown on wheat or millet seeds. The next day, mineral amendment (2-3‰ of the dry weight in the same proportions) is inserted into the bottle relatively distant from the mycelium. EMF is applied immediately after in the usual way. The incubation and the appearance of primordia takes place in a closed container, in the dark or dimly lit rooms, at a temperature of 20-25 C. degrees in the presence, inside the bottle, of high $CO_2$ percentages (20,000-40,000 ppm). After about 30-40 days the mycelium has colonized all over the substrate, a yellowish exudate and a thickening of the mycelium appear on the surface, and after further 10-12 days primordia appear in the form of small grayish masses of 2.5-6 cm in diameter. The containers remain closed for another 2-3 days, then the top of the bottle is open and the temperature is reduced at 16-18 C. degrees, the relative humidity is maintained between 80 and 95%, the light to values of 200-500 lux, the $CO_2$ content of not more than 0.1%. Over a period of 18-25 days, the carpophores are ready for the harvest (the time can be less with EMF). The production is equal to ¼ of the weight of compound. The treatment with pulsed light provide immediately the expected results (2,000 IU per serving of fresh pro day) given the already good amount in the untreated mushroom.

Grifola frondosa is one of the most studied mushrooms for its officinal features. It produces substances with anti-tumor, antiviral, antibacterial, antifungal, immunostimulatory, hepatoprotective, antidiabetic, antihypertensive effects (Wasser and Weiss, 1999; Hobbs, 2000; Maywell, 2001). G. frondosa extracts have also demonstrated direct antioxidant effects against some free radicals (Mau, 2004), whose antioxidant capacity seems to be linked to the phenolic content of the mycelium. However, the most studied compounds are beta glucans (beta 1-3 and beta glucan 1-6) which abound in both the mycelium and the fruiting body (Hobbs, 2000; Reshetnikof et al. 2001). There are clear indications that the culture conditions and the growth substrate can greatly affect the amount and composition of the polysaccharides (Ohno et al., 1985, 1986 Mizuno and Zhuang, 1995). Generally, a better therapeutic effect is obtained with the extracts of the fruiting body, in which a greater number of beta-glucans compared to the mycelium is present (Minato et al., 2001, Reshetnikof et al. 2001). The modifications to the substrate according to the invention, intended to increase the content of minerals, trace elements, amino acids and vitamin D (ergothionenine) and proteins, can have an impact on the content and quality of the beta-glucan products, reaching the powerful action of the beta glucan as the fraction of Maitake D and MD, present in the purified and active extracts against cancer, starting from the officinal mushroom taken daily as a food. Among other things, the Grifola frondosa is one of the most digestible and less allergenic mushrooms present on the market. It can be taken fresh, dried or preserved in oil.

To date twenty-nine different fractions of the fruiting body extracts of G. frondosa have been characterized, twenty-eight of which have proved BRM activity (Mizuno et al., 1986, Zhuang et al., 1994). Isolated beta glucans present differences in the composition and structure of the polysaccharide chain; some are glycoproteins, others lack the protein component, but all are affected, for better or for worse, by the extraction conditions and technological procedures used. For this reason, the mushroom in toto taken as a food is the best form of intake of such BRM. However, one cannot fail to mention the fraction D (main chain with beta bonds 1-3 and beta branching 1-6) that in vitro has shown antitumor effects against mouse sarcoma 180 and against prostate cancer (Mizuno et al., 1986; Kurashige et al., 1997; Konno et al., 2002) for a direct cytotoxic effect on the prostate tumor cells in addition to an early stimulatory effect on NK lymphocytes and a more long term inhibitory effect due to the release of the factors IL-12 from macrophages (Kodama et al., 2002, 2004) responsible for the elimination of tumor cells. Most recently another purer fraction of the D has been isolated, i.e. the MD fraction, injected in the animal; it produces an antitumor effect greater than the fraction D (Maywell, 2001). Oral intake of MD fraction gave good results in the regression of tumors (Kodama et al., 2002) in Japan when one hundred and sixty people suffering from lung cancer, breast and liver at advanced phase (III-IV) were treated; there has been a significant regression of the tumor and/or improvement of symptoms from 50 to 80% of cases of breast and lung cancer, while other studies have shown that almost 80% of cases improved the general conditions; the effects of chemotherapy (CHT), then, were less heavy, and with the same percentage (83%) there was an improvement in pain symptoms. The use of Grifola frondosa was also studied in the prevention of tumor metastasis. Cells of hepatocarcinoma MM-164 were injected into three groups of mice: group one was fed with a diet containing 20% of powder of G. frondosa, group two was fed with fraction D in 1 mg/kg and control group three was fed with a normal diet. After 30 days, the number of liver metastases has been rated; liver metastasis was inhibited with fraction D in 91.3% of cases, with dust in 81.3%. It should be noted the excellent result of the powder with much less substance of the fraction D, which has led to speculate that the food daily use of the mushroom can reduce the risk of metastasis by 80-90%. A remarkable effect of immune stimulation has been reported with the polysaccharide-glycoprotein extract (heteroglycan bound to proteins) of grifolano MT-2 (1-3 beta glucan with branching 1-6) that activates NK and T lymphocytes and promotes the release of interleukin-1 and superoxide anion by macrophages (Adachi et al., 1987; Zhuang et al., 1993). Another variant, the D-Grifolan, has been studied in cell lines of non-hormone dependent prostate cancer (Fullerton et al., 2000). Within 24 hours, there was obtained almost complete death of the neoplastic cells (more than 95%) with doses of 500 mg/ml of D-Gryphon. The association with vitamin C (200 mg/ml) allowed to drastically reduce the D-Grifon (30-60 mg/ml), with the same effectiveness being maintained. This has had the effect of recommending the intake of vitamin C, in conjunction with the mushroom, because it acts synergistically by inducing apoptosis of cancer cells from damage by oxidative stress.

This pro-apoptotic action, which applies to all the mushrooms in the oncology field, in particular to the officinal ones according to the invention, connects the immunostimulatory action of beta-glucans to that antioxidant of the vitamin C. Said action is mediated, also, by the inhibition of glyoxalase I, an enzyme of vital detoxification for the cell. The block of this enzyme leads to the accumulation of methyl-glyoxal which has a cytotoxic effect in particular on tumor cells that typically use the way of anaerobic glycolysis in order to produce energy. The final effect is then a block of the cellular metabolism and the death of neoplastic cells, which are more fragile, from a biochemical point of view, if compared with the normal ones, which in fact are not affected by this metabolic block. The dosages of vitamin C are absolutely comparable with those indicated by Linus Pauling and, for this reason, are fully included in the method of the officinal mushrooms. A daily intake of supplement of vitamin C from natural sources (Rose-hips etc.) variable from 300 mg to 3 g depending on the degree of neoplastic disease is recommended.

Another compound, the GFL (N-acetylgalactosamine-lectin), showed cytotoxicity to HeLa cells (tumor line of the human uterine cervix cells used for in vitro studies) probably due to an interaction between the lectin and carboxy domains of the tumor cell receptors (Kawagishi, 1995).

In 1998 in the USA, the FDA authorized the phase two of the studies on the potential of the D fraction in treatment of breast and prostate cancers. These studies have shown that the antitumor effect is due to different types of action: protection of healthy cells, slowing or inhibition of tumor growth and a role in the inhibition of metastasis formation (Maywell, 2001).

As mentioned earlier, it is conceivable that the effect of the amendments of G. frondosa officinalis, leads to anticancer actions similar to those of extracts of D and MD fractions, by stimulating apoptosis in most common cancers such as colorectal, lung, liver and breast cancer, and in particular in those hormone dependent that are derived from glands such as mammary, prostate and uterine cervix adenocarcinomas.

*Agaricus brasiliensis* off.
*Agaricus blazei* Murrill off.

Until 2001 there were two mushrooms: *A. blazei* Murrill, in honor of W. A. Murrill who discovered it in Florida in 1945, and another blazei (Heinemann). Then in 2005 in Brazil in the state of São Paulo another similar species was found, but taxonomists decided that it was a different species, the *A. brasiliensis*. Probably many studies on the officinal properties pertain to both species, having been cultivated strains from various regions indifferently. Indicated with the name of AbM (*Agaricus blazei* Murrill) is one of the best-known officinal mushrooms, studied and used for cancer patients, and for this reason it is inserted among those officinal.

The *A. brasiliensis* has a high protein content, 37-48% of dry matter, the highest among the cultivated mushrooms, 40% carbohydrates, 3% fat and about 7% minerals of which 2.5% potassium, 1% phosphorus and 0.1% magnesium. It has a good content of vitamins of the B and D group and several essential elements including iron, manganese, zinc and copper (Amazonas, 2005). It is commercialized fresh, dried whole or in powder and as extract.

This mushroom, similarly to the champignon to which it belongs as family, needs a growth substrate already partly degraded by other microorganisms. For this reason, the elements of the substrate must be subjected to a fermentation and pasteurization treatment. A simple substrate (Stamets, 2000) is the manure of cattle produced by not more than a week. It is advisable, however, to use the following substrate: residues of sugar cane cultivation (45%) or various types of hay (44%), soy bran (25%), urea (1%), ammonium sulphate (1%), phosphate (0.5%), gypsum (3%) and calcium carbonate (3%). Egg powder must be added to the substrate in a variable percentage from 3% to 5% of the dry weight. The initial phase is the fermentation similar to that of the *A. bisporus*. The optimal nitrogen content of the substrate must be high and the moisture of the mixture is brought to a level of 75%, the pH is basic (9-9.5), the C/N ratio is 30/1, the nitrogen content of the dry matter is around 2%. In the first fermentation phase in the presence of correct conditions of humidity, temperature and oxygen, the processes of disintegration and transformation of the compound start due to mesophilic microorganisms that utilize the carbohydrates of the mass with increased temperature and selection of a population of thermophilic microorganisms that increase in an optimal manner at temperatures above 45 C. degrees; but the temperature in the inner parts of the compound can also reach 75-80 C. degrees. Therefore, it must be completely reshuffled three times with a pause of three days. Then the fermentation ends after 9 days, then the substrate must be pasteurized for a day at 60-66 C. degrees, and then conditioned for two days at 49-52 C degrees. When the temperature has fallen below 35 C. degrees, the substrate is placed in open and airy bottles and sowing takes place, the bottles being carefully filled to ¾ of substrate. The temperature is kept at 25-30 C. degrees, with a humidity of 80-85%, a slight air exchange and exposure to EMF being ensured. In these conditions the colonization occurs in 15-20 days. When the mycelium has crowded almost the whole substrate, it is necessary to add in the bottle a layer of 3-5 cm thick soil formed by peat amended with 10% of gypsum after cleansing, together with the trace elements at 2-3‰ of the substrate at the same proportions. In order to start the fruiting with the differentiation of primordia, it is necessary to lower the temperature just below 25 C. degrees, to reduce $CO_2$ by ventilation to 400-800 ppm, to maintain the relative humidity at about 85-90% and a low illumination (100-200 lux). After about 20-25 days in order to encourage the development of the carpophores the temperature is raised to 24-27 C degrees, intensive EMF are applied and the first harvest is done after 4-8 days. It is possible to have two or three mushroomings. The development is favored by overturning the bottle. Generally, a production equal to 10% of the weight of the substrate is obtained, with reduced times thanks to EMF.

Given in the vast literature on the officinal properties of this mushroom are the anticancer, immunostimulating, antibacterial, hepatoprotective properties, the protection of DNA from oxidation and the antioxidant properties in general (Ker et al., 2005; Zhong et al., 2005; Benardshaw et al., 2005, 2006: Bellini et al., 2006; Grinde et al., 2006; Jin et al., 2006). These properties are mostly due to beta 1-3 glucan with beta 1-6 branching, with the amount of glucan being superior to that of all other officinal mushrooms, since this quantity can reach 14% of the total polysaccharides of the mushroom (Stamets, 2000). The anti-tumor action of *A. blazei* extracts is due both to an indirect action that involves the stimulation of the patient's immune response and to the inhibition of angiogenesis that hinders the formation of metastases (Kimura et al., 2004; Kobayashi et al., 2005; Zhang et al., 2006). Moreover, the extracts cause apoptosis of tumor cells but not in healthy ones (Jin et al., 2006). The *A. blazei* extracts induce the activity of NK cells (o lymphocytes) and stimulate the production of interferon gamma, causing in this way a more efficient elimination of the tumor cells from the body (Benardshaw et al., 2005, Zhong et al., 2006). The response of the host's cells in the presence of *A. blazei* extracts is mediated by cell receptors of the toll-like receptor type (Kassai et al., 2004). Many cytotoxic and carcinostatic polysaccharides isolated from the mycelium, the fruiting body and the spores are contained in AbM and variously called (AB-P, ATOM, AB-FP). Among other, they have an action of promotion of the activities of the p38 MAPK protein (Membrane Activate Protein Kinase) in the suppression of HRA cell line of ovarian cancer and in the induction of apoptosis processes such as translocation of the pro-apoptotic protein Bax from the cytosol to the mitochondria, with the release of cytochrome C and activation of caspase 9. Many of these biochemical mechanisms involve the interaction among the antigen presenting cells (APC), the NK cells and the cytotoxic T lymphocytes with production of gamma interferon (cytotoxic and antiproliferative), and specific interleukins, such as IL-12, are responsible for the cell activation. But the AbM has the peculiarity of the antineoplastic effect not only thanks to the polysaccharides, but also to the lipids and amino acids (proteins). In fact, the AbM contains 3.6% of lipids of which 73.2% are phospholipids with antineoplastic effect (Wasser and Weiss, 1999) and has a high content of tyrosinase, i.e. the enzyme that catalyzes the transformation of the amino acid tyrosine into dopamine, allowing the body to produce significant amounts of ubiquinone or coenzyme Q. This is an essential molecule for the electron transport at mitochondrial level, for the consumption of oxygen and the production of energy. In AbM, the antiangiogenic activity of ergosterol was investigated, activity that inhibits neovascularization induced by cells of Lewis Lung Carcinoma (LLC) in mouse through dermal contact and intraperitoneal injection, and at increasing doses: the ergosterol highlighted a neovascularization inhibition action in a dose dependent mode (Takaku et al., 2001). The action in the immune system of polysaccharides of the AbM that allows a systemic anti-tumor cytotoxic action, has an excellent combination with action of the lipids which exert a direct and specific anti-tumor activity at the cellular level, along with that of ubiquinone, which increases cell reactivity, oxygenates the tissues, stimulates toxin purification. According to scientific literature, the antineoplastic is demonstrated especially against solid cancers, cancers related to ascites (ovarian and hepatic ascites), and cancers induced by chemical carcinogens. Therapeutic successes are reported in patients with leukemia and lymphomas, especially non-Hodgkin lymphomas.

It is clear that the enrichment of the officinal according to the invention with those substances such as amino acids and lipids (ergosterol) that are already present in the mushroom can only enhance the synergy with beta-glucans mainly present in this mushroom, with a consequence that it is a nutraceutical already in the form of food.

For completeness it should be remembered that in the mycelium there is a carcinogenic compound, the agaritine, that is a hydrazine present, and in a more concentrated form, in his next of kin, the *A. bisporus*. It must be stressed that the agaritine is in the mycelium; however, the biochemical complex in the fruiting body counteracts this negative issue effectively, thanks to the well-known anti-carcinogenic effects of this mushroom. But this fact, coupled with the reporting of hepatotoxic effects provided by Japanese doctors (Mukai et al., 2006), for the precautionary principle, can lead to cyclical assumptions especially in patients with diseased liver, as already seen for Shiitake, before conducting further clinical and epidemiological surveys.

Other Mushrooms

There are other mushrooms with medicinal properties that can be used in cancer diseases often inedible as the *Inonotus obliquus, Fomes fomentarius, Cordyceps sinensis, Androdia camphorate*, etc. Regards these mushrooms, at the present, there is insufficient information about the techniques of cultivation, the strains used and the possibilities and usefulness of the amendments in the transformation to officinal mushrooms according to the invention. Waiting to include them in the list of officinal mushrooms, along with others on the basis of scientific evidence, it is necessary to insert three inedible mushrooms that are cornerstones of medicinal mushrooms for oncological diseases: *Ganoderma lucidum, Coriolus versicolor, Phellinus linteus*.

Because they are devoid of palatability and considered inedible mushrooms according to the regulations of various countries, these mushrooms can be taken only in the form of dry/fresh mushrooms, in infusion or in soups, making sure to remove them from the soup before consuming the meal.

*Ganoderma lucidum* off.

Reishi, the Japanese name of *Ganoderma lucidum*, is perhaps, among the mushrooms defined as "Chinese", quintessentially the most known and consumed mushroom in the world for its medicinal virtues. In fact, despite its hard-leathery consistency, therefore not edible, it is among the most consumed mushrooms (and not only in infusion); because its daily intake assured "long life and good health," it is known as mushroom of 3,000 years or mushroom of Chinese emperors.

*Ganoderma lucidum* contains: mineral salts (iron, zinc, copper, manganese, potassium, magnesium, calcium, but especially germanium), vitamin B (folic acid), seventeen amino acids including the essential ones, polysaccharides, sterols, substances having antihistaminic activity (adenosine, triterpenes, lucidenic acid, ganoderic acid, etc.).

Automated techniques for the cultivation of this mushroom are only recently performed although often not at an industrial scale. The components of the substrate are plant sawdust and shavings (88%), wheat bran (10%), sucrose (1%) and calcium carbonate (1%) (Chiu et al., 2000). After thorough mixing and addition of 1-2% egg powder, the substrate is allowed to ferment in a heap, turned over several times a day, for 4-7 days, after which it is packaged in bottles according to the invention and then sterilized in an autoclave at 121 C. degrees for about two hours. In a sterile air current, the bottles are opened and sown with mycelium reared on wheat, the mineral amendment is added at a concentration of 3‰ of the dry substrate, a half of the mineral amendment being germanium salts, and then placed to incubate at an average temperature of 25 C. degrees in the dark for 30 days. EMF cycles are then applied as usually. The environmental humidity must be high (85-95%); the temperature is first lowered (18-24 C degrees), then is increased to 25-28 C. degrees for two final weeks for the fruiting; an illumination of 750-1,500 lux for 12 hours a day is necessary. After the first harvest, still another production can be obtained by overturning the bottle and opening the cap at the bottom, for a total of about 90 g of carpophore from bottles containing 700 g of substrate. EMF shorten the process by about ⅓ and allow the saturation in Ge.

The *Ganoderma lucidum* is one of the mushrooms most studied by mainstream science with over a thousand publications, for its medicinal properties. A complex group of polysaccharides with immunostimulatory properties was isolated: among them there are beta-glucans, hetero beta-glucans and chitin-xylo-glucans; studies on laboratory animal have shown anti-tumor and anti-metastatic effects of the polysaccharides of this mushroom (Silva, 2004; Lu et al., 2004; Fan, 2005; Wang et al., 1997). In some cell lines of the human tumors the action of these compounds seems to be related to stimulation of the macrophages and T lymphocytes with the consequent production of various cytokines such as IL-1 and IL-6. Some glycoproteins stimulate the production of spleen cells that are responsible for the maturation of lymphocytes, and the production of cytokines (Hsu et al., 2004). In literature, an antioxidant property of *G. lucidum* extracts (Jones and Jenardhanan, 2000), is also reported that is highlighted in the inhibition of lipid peroxidation in some biological systems and in the protection from acute cardiac toxicity induced by ethanol (Wong et al., 2004; Sun et al., 2004). This powerful antioxidant action, which is certified by numerous studies showing protection from bronchitis and herpes, pro-apoptotic and anti-inflammatory actions along with those hepatoprotective, immunomodulatory and anti-diabetic (Gao et al., 2003, Hsu et al., 2004; Liu et al., 2004; Hong et al., 2004; Fan et al., 2005; Kim et al., 2005; Myojin et al., 2005; Li et al., 2005), is due to the presence of a certain quantity of germanium that is the most powerful antioxidant existing in nature; according to the invention, it is concentrated with the amendment.

Among other things, the presence of germanium with its powerful antioxidant capacity, is the reason of the only two oncological pathologies where a role of oxidative stress is established and where the *G. lucidum* is indicated: nasopharyngeal carcinoma and chronic myelogenous leukemia.

Substantially the *G. lucidum* officinal is a large concentration of organic germanium; therefore, the amendment may be modified compared to the standard, by increasing the dosage of inorganic germanium to 50%. The antioxidant activity due to germanium, water-soluble non-metal, is linked to the lasting anti-oxidant activity of the ergothioneine. As a result, Ge is much more active and powerful also in the form of recommended intake, herbal tea in hot water, the most suitable for the dissolved action of the trace element with tropism amplified in all oncological diseases of the respiratory and gastrointestinal apparatus.

*Coriolus versicolor* off. Super and Extra

Among the medicinal mushrooms, it is the most intensively studied for its multiple properties and anti-cancer action that is carried out by substances extracted from the carpophores and the mycelium. This basidiomycete belongs to the class of the mushrooms that degrade lignin. From this property much of antineoplastic action of *C. versicolor* derives. Lignin is a polymeric material that reinforces the wall of plant cells as it acts as a matrix for the cellulose microfibers. Lignin is one of the most durable materials in nature that combines resistance to weathering and ultraviolet radiations with elasticity and plasticity. Fungal laccases, in particular those of *C. versicolor* (Crisante, University of Tuscia, 2013) are the only ones that can degrade lignin first to monomeric compounds, lignans, which, at appropriate concentrations and taken by living systems, can act as secondary metabolites or form the basic constituents incorporated in polysaccharides, proteins or lipid constituting the same mushroom. The lignin monomers (two units of 2-phenylpropane) being derived from fungal catabolism are enantiomerically pure because they are produced by a stereo chemically controlled coupling, and thus active, but the majority of dietary lignans is provided from flax seeds that contain predominantly secoisolariciresinol (greater than 3.7 g/kg of dry weight). This applies in particular for the mushrooms *C. versicolor* and *P. ostreatus*. Recent studies are known on the action of the flax seeds against breast cancer. Probably the laccases are aided by the high temperatures produced in the substrate that develop during the fermentation process and by some other enzyme. The processes of oxidative degradation of lignin, which takes place by means of the laccases but at lower temperatures, are mediated by a class of chemical molecules called mediators that mediate allosterically the reaction between enzyme, molecular substrate and oxygen to maintain the reaction at low redox potential of laccases. The system $O_2$/laccases/mediator (Crisante, 2013) was used for the oxidation of benzyl portion of catechins obtaining compounds with chemo preventive and anticancer activity as taxifolin and the precursors of proanthocyanidins. All this to say that during the degradation fermentative process of the substrate as well as during the mycelium incubation and development process by the laccases, secondary metabolites are produced having biological activity (BAM) as lignans and proanthocyanidins that already act against cancer. Then base molecules, components of the polysaccharides, the best-known anti-cancer agents of *C. versicolor* as the PSK (polysaccharide-K, Krestin) and PSP (polysaccharide-peptide).

Therefore, a method to increase lignans, proanthocyanidins, PSP and PSK is to increase laccases and this is achieved by adding copper to the substrate. Probably in nature the amount of the active compounds is in relation to the amount of copper present dispersed in the soil. If the fermentation occurs at high temperatures and low oxygen content more lignans and proanthocyanidins in the mycelium and then in the fruiting body will be obtained (*C. versicolor* off. Super). If fermentation is stopped prematurely by lowering the temperature and by airing the mixture, a sudden fruiting and a richer carpophore in PSP and PSK (*C. versicolor* off. Extra) will be obtained.

The optimal growth substrate is formed by sawdust and shorts of various forest plants with a composition similar to that of *Lentinus edodes*. The substrate is moistened to 65-70%, egg powder is added to the 2-3% of the dry weight. The substrate is left to ferment for a few days, then inserted in the bottles according to the invention, and then sterilized in an autoclave.

The sowing is done using mycelium grown on sawdust and shavings to which the same mineral fertilizer at a rate of 3.2‰ of the dry weight, composed of 80% copper-based mineral compounds, must be added. The incubation is carried out at a temperature of about 25 C. degrees for about three weeks. At the end the packages are opened at the top to enhance the development of basidioma. The conditions required in the various phases of growth of the mushrooms are a temperature of 18-25 C. degrees, a high humidity, a good air exchange ($CO_2$ at 500-1,000 ppm) and an illumination of 500-2,000 lux. The bottles are also exposed to EMF as a practice. Since the appearance of primordia to maturation there are about 40-50 days (20-30 days with MCF and incorporation of Cu to 100%). After harvesting the irradiation produces a discrete quantity of vitamin D2. The mushroomings may be two or three during several months with a production of 10-20% of the dry weight of the bottle.

The PSK was isolated in Japan in the '60s. It is made of 68% polysaccharide and 32% protein. Its molecular weight is 94-100 kDa. The polysaccharide is composed of the monomers of D-glucopyranose linked in the main chain with beta 1-4 bonds and with beta 1-3 bonds in the side chains. These latter, in their turn, have other side branches united with beta 1-6 bonds which bind the polysaccharide to the protein part of the molecule by O—N glycosidic linkages. In the polysaccharide, the main sugar is glucose but there are also others. The protein part is rich in amino acids such as aspartic acid and glutamic acid (Kidd, 2000). The PSK is by weight about ⅓ of polysaccharides extracted from the mycelium. The results in vitro and on laboratory animals show the effectiveness of PSK in the treatment of certain cancers: adeno sarcoma, fibro sarcoma, mast cell tumors, plasmacytoma, melanoma, sarcoma, breast, lung and colon carcinoma (Tsukagoshi et al., 1984).

The PSP was isolated in China in the '80s and has a molecular weight of 100 kDa. It is closely related to the structure of the PSK and it differs from it because the bonds in the main chain are mostly beta 1-3 alternating with some alpha 1-4; also in this case, the main sugar is the D-glucose. Experiments on animals have shown that the PSP stimulates the proliferation of T cells and the production of interferon gamma and interleukin 2 (Ng, 1998). It was demonstrated that the PSP is a non-toxic compound with immunostimulatory activity that enhances both the quality of life of cancer patients and their survival (Jong and Yang 1999). Also, it relieves the side effects and prevents depression of the immune system in patients undergoing a diagnostic therapeutic uterine curettage (RDT) and chemotherapy (CHT) (Ng, 1998). The PSP has proven to have a direct action against several types of cancer such as stomach and respiratory system cancer, action that is enhanced by its ability to induce apoptosis in cancer cells but not in normal cells (Dong et al., 1996; Jong and yang, 1999; Heish et al., 2002; Chow et al., 2003; Tsang et al., 2003; Yang et al., 2005). However, not all cancers respond to treatment (Dong, 1997). Even the PSP possesses antimetastatic properties for inhibition of neoangiogenesis (Ho et al., 2004).

Both the PSK and PSP are well absorbed and tolerated orally and, given the extreme tolerability, can used up to 20 g of dried carpophore per day for teas and up to 5 g per day in capsules.

The double type of production, more lignans or more polysaccharides, obtained amending the substrate with copper and modulating the fermentation, ensures an important presence of enzyme laccase early or late. This determines final characteristics of the mushroom different in the concentration of lignans or polysaccharides PSP-PSK with the consequence of two types of *Coriolus versicolor officinalis*, i.e. the super and the extra that can be used in various carcinomas with more or less immune compromission, as well as in various phases of the same oncological disease with more or less direct cytotoxic action or neoangiogenesis/metastases inhibition.

*Phellinus linteus* off.

The *Phellinus linteus* (P.I.), in English Meshima, is a basidiomycete belonging to the poliporacee family. It is a mushroom widely used in folk medicine in the Far East, especially in the gastro-intestinal diseases and in the diabetes. The pharmacological activity is due to the polysaccharides of varying composition, with antioxidant, anti-diabetic and anti-tumor capacities. In fact, the P.I. is one of the most important and studied in cancer mushrooms, for immunomodulation capacities, since the study of Sliva et al., published in the media with wide coverage in the British Journal of Cancer in 2008, about the inhibitory effect (AKT-mediated) on growth, angiogenesis and invasiveness of breast cancer cells. But already since 1969 Chihara et al. was able to show that polysaccharide extracts of P.I. suppressed the tumor growth in vivo; more recently furans have shown activity against the murine melanoma cells and human lung adenocarcinoma. Kim et al. in 2006 demonstrated that a polysaccharide complex extracted from P.I. greatly increases the proliferation of B lymphocytes, the production of cytokines and nitric oxide by macrophages and especially the cytolysis of the YAC-1 lymphoma cells in vitro. After that other studies have demonstrated the NK lymphocytes stimulation action of P.I. The NK lymphocytes are known for their ability to lyse various types of cancer cells by exocytosis of granules containing perforins and cause lysis of the cell through the "perforation" of the cell membrane. In addition, the NK lymphocytes are responsible for both early and late inhibitory effects on tumor growth by correlating the absolute number of NK lymphocytes both on patient survival skills with inhibition of disease progression and in response to the CHT, in particular in pancreatic cancer (Davis et al., 2012). These effects being induced by P.I. on the immunomodulation concern especially the NK cell activity. The P.I. immunomodulatory power has been clinically confirmed in 2013 (Chang et al.) always in the adenocarcinoma of the pancreas, where a commercial polysaccharide complex extracted from P.I. (Aclang) was used in a retrospective study as an adjunct to the CHT on 103 patients after surgical resection of ductal adenocarcinoma of the pancreas, with significant results on relapses for the increase of the disease-free interval by almost three times in those treated with CHT+Aclang than those without P.I. These results on pancreatic cancer, combined with those on colon cancer (Song et al., 2011, Li et al. 2011), breast cancer (Lu et al. 2009, Sliva et al., 2008), and carcinoma of the lung (Guo et al., 2007), make P.I. one of the most active mushrooms against cancer thanks to an immune-mediated action that moves the Th1-Th2 balance toward Th2 with direct cytotoxic activation by NK lymphocytes with an effect of suppression of cancer cell growth, relapse decreases, CHT stimulus and reinforcement with reduced side effects and pain, and also in cancer prevention. The immune modulation produced by P.I., is also present in other diseases like allergies and food intolerances, porous bowel syndrome and arthritis, in which also the action of the large amount of chitin in P.I. is relevant. The chitin is an indigestible polysaccharide acting a bit like mortar that fixes the injuries to the bowel walls and a bit like a regulator of bacteria by acting on the lymph nodes and on the local immune balance.

Among the mineral components P.I. contains in addition to copper also germanium (variety rimosus and gilvus, Chenghom 2010) and represents a middle way between the *Coriolus versicolor* and *Ganoderma lucidum*.

This is also confirmed by the cultivation technique in officinal that follows literally the one described for the *Coriolus versicolor* with some variants depending on *Ganoderma lucidum*, with a substantial variation of the mineral amendment concentration (2-3‰ of the dry weight of the substrate) unbalanced between the two components (Ge and Cu) which likewise are 70% of the mineral compound. The officinality according to the present invention enhances the physiological actions of the substances in P.I. ensuring a good absorption mainly in the form of herbal tea and tea, due to the extraction of minerals in hot water and polysaccharides, in addition to the optimal and pleasant mode of intake for cancer population.

Other Considered Edible Mushrooms

*Hericium erinaceus* off.

It is a rare edible parasite mushroom that prefers the still alive oak trees. The fruiting body resembles the head of a monkey so that in Asia it is known by this name. 100 g thereof contains 31.7 g of proteins, 4 g of fat, 9.8 g of ash, 17.6 g of carbohydrates, 30 g of fibers, 1.2 mg of sodium, 1.2 mg of phosphorus, 20.3 mg of iron, 1.3 mg of calcium, 4.46 mg of potassium, 123 mg of magnesium, 5.3 mg of thiamine, 3.9 mg of riboflavin, 240 IU of ergocalciferol, 18.3 mg of niacin, 381 mg of ergosterol and traces of zinc, germanium, and selenium. The mushroom contains beta-glucans and various polysaccharides (hericenones, etc.) with effect on the esophageal and gastric cancer (Ying, 1987) and a nerve growth stimulating factor (erinacine) (NGF) (Kawagishi 1991-94) that is potentially useful for dementia. Polysaccharide aqueous extracts are useful in the gastro intestinal tract diseases such as gastritis, ulcers, ulcerative colitis etc. The action of the polysaccharide extracts on gastric and esophageal cancer is immune-mediated.

The cultivation in officinal is analogous to that of *Lentinus edodes* (Shiitake): the growth phase of the mycelium on the substrate additioned with egg powder (2-3% of the dry weight), varies from 10 to 14 days at a temperature between 21 and 24 C. degrees with a relative humidity of 95-100% and $CO_2$ from 5000 to 40000 ppm. At the beginning, EMF will be low. Around the 7th day, the salts are added in the container to a proportion of 1-2‰ with a preponderance (70%) between germanium and selenium and the remainder in equal parts of Zn and Cu. The goal of this supplementation is to give a boost of antioxidants in the officinal. The formation of primordia is obtained in 3-5 days (1-2 days with EMF); the ventilation increases, the temperature decreases to 10-15 C. degrees and the $CO_2$ to 500-700 ppm and with an illumination (500-1000 lux). The development of the carpophores, with the high-power EMF, takes place in a short time (4-5 days) if the temperature increases to 18-24 C. degrees and the other parameters are kept stable. There may be other 1-2 mushroomings.

Given the already good presence of ergosterol and vitamin D2 in the fresh mushroom, an increase thereof by pulsed light has an exponential trend and can easily reach 2000 IU per serving and per day. This mushroom is a good compromise between the organoleptic properties as food and the implemented properties, but not exasperated, as officinal mushroom. This proves that one can get a really effective mushroom on cancer, especially gastro-intestinal cancer; the mushroom can be taken as daily food and in various ways and finally also palatable.

*Poria cocos* off.

It is an ascomycete associated to the roots of conifers, and the sclerotium (considered a truffle) is doggedly sought and eagerly consumed in Africa and in Southeast Asia. In the East, it is used in folk medicine since thousands of years as a sedative and diuretic. Isolated from it were polysaccharides and triterpenes to which immunomodulatory and anticancer activity was attributed. It is often used, along with plants and herbs, in the treatment of hepatitis. Soluble heteropolysaccharides isolated from *Poria cocos* have shown anticancer properties in cell lines of gastric carcinoma and sarcoma 180. Some BAM isolated from sclerotium (ergosterol peroxide, tumulosic acid, pachimic acid etc.) and triterpene compounds showed strong inhibitory effect on cell lines of colo rectal and gastric cancer in vitro.

The cultivation and officinal transformation techniques derive from the first phase (sclerotium formation) of that already described for the *Morchella conica*.

Full potential in neoplastic/degenerative diseases is not known, but the officinality seems to implement generic immunomodulatory and antitumor properties. It can be taken as it is usual for other tubers; it can also be used as a sauce for pasta in the same way as for the truffle for the cited similar agreeable aroma.

The mushrooms thus obtained and processed with concentration and standardization of substances biologically active in the prevention and treatment of the oncological/degenerative patient, add a therapeutic functional activity to the basic healthy activity already present. They will be able to add the suffix "*officinalis*" to the Latin scientific name of species.

The invention claimed is:

1. A chemical-physical method of producing mushrooms enriched in biologically active substances including the subsequent steps, in order of operation, of:
    step i—isolation and development of a mycelium of a desired mushroom species before sowing,
    step ii—maturation of a pre-dosed substratum in containers in a greenhouse environment comprising adding egg powder and inorganic trace elements to the substratum,
    step iii—sowing the mycelium in the pre-dosed substratum,
    step iv—incubation of the mycelium and development of mushroom primordia in controlled conditions in the greenhouse environment assisted by machines and processors adapted to adjust temperature, humidity and irradiation,
    step v—development of carpophores,
    step vi—carpophore harvest,
    step vii—carpophore treatment by pulsed light for stimulating the production of vitamin D2,
    wherein a physical treatment comprising submitting said greenhouse environment to electromagnetic fields (EMF) is performed in all the steps i to v before the carpophore harvest, in order to improve the metabolic capacity of the substratum by promoting the enzyme production of active metabolites and the organication of the inorganic trace elements to improve quality and quantity of the mushrooms,
    wherein the mushrooms obtained have therapeutic capacities that counter cell degeneration in various diseases, and
    wherein said EMF is of 15-25 mT for an interval of 10-20 min/day after the isolation and development of the mycelium in step i, and before the sowing in step iii, and continuing for all the steps up to the development of the mushroom primordia in step iv, wherein said EMF is of 100 mT for an interval of 2-3 min/day after the development of primordia in step iv, and until carpophore harvest in step vi.

2. The method according to claim 1, wherein the egg powder is added to the substratum in a ratio by weight in a range of 2 to 5% of the substratum dry weight in the containers, so that the carpophore develops ergothioneine in a biologically active quantity.

3. The method according to claim 1, wherein said inorganic trace elements comprise a complex of salts of selenium, germanium, zinc and copper.

4. The method according to claim 3, wherein said salts are added in a ratio by weight in a range of 1 to 3% of the substratum dry weight in the containers.

5. The method of claim 1, wherein the mushroom species are selected from the group comprising: *Pleurotus eryngii, Pleurotus ostreatus, Lentinus edodes* "Shiitake", *Flammulina velutipes, Morchella conica* Parsons, *Auricularia auricula-judae* (L.:Fr.) Schroeter, *Auricularia polytricha* (Mont.) Sacc., *Tremella fuciformis* Berk. Brand, *Agrocybe aegerita, Pholiota nameko, Hypsizygus tessulatus* (Bull.) Singer, *Hypsizygus ulmarius, Grifola frondosa* "Maitake", *Ganoderma lucidum, Coriolus versicolor, Phellinus linteus, Hericium erinaceus, Poria cocos*.

6. The method according to claim 1, wherein said therapeutic capacities are therapeutic capacities in the oncology field.

* * * * *